(12) United States Patent
Wang et al.

(10) Patent No.: US 12,300,822 B2
(45) Date of Patent: May 13, 2025

(54) CATHODE STABILIZATION METHOD USING ELECTROCHEMICAL OXIDATIVE ADDITIVES IN AQUEOUS ALKALI-ION BATTERIES

(71) Applicant: University of Maryland, College Park, College Park, MD (US)

(72) Inventors: Chunsheng Wang, Silver Spring, MD (US); Fei Wang, College Park, MD (US)

(73) Assignee: UNIVERSITY OF MARYLAND, COLLEGE PARK, College Park, MD (US)

(*) Notice: Subject to any disclaimer, the term of this patent is extended or adjusted under 35 U.S.C. 154(b) by 190 days.

(21) Appl. No.: 16/471,886

(22) PCT Filed: Dec. 20, 2017

(86) PCT No.: PCT/US2017/067647
§ 371 (c)(1),
(2) Date: Jun. 20, 2019

(87) PCT Pub. No.: WO2018/119102
PCT Pub. Date: Jun. 28, 2018

(65) Prior Publication Data
US 2019/0355992 A1    Nov. 21, 2019

Related U.S. Application Data

(60) Provisional application No. 62/436,702, filed on Dec. 20, 2016.

(51) Int. Cl.
*H01M 4/62* (2006.01)
*H01M 4/02* (2006.01)
(Continued)

(52) U.S. Cl.
CPC ......... *H01M 4/628* (2013.01); *H01M 4/0445* (2013.01); *H01M 4/366* (2013.01);
(Continued)

(58) Field of Classification Search
CPC .... H01M 4/628; H01M 4/0445; H01M 4/366; H01M 4/525; H01M 10/0525;
(Continued)

(56) References Cited

U.S. PATENT DOCUMENTS

2006/0154144 A1    7/2006    Gorkovenko et al.
2007/0224502 A1*   9/2007    Affinito .................. H01M 4/62
                                                    429/50
(Continued)

OTHER PUBLICATIONS

Zhao et al., "Diphenyl disulfide as a new bifunctional film-forming additive for high-voltage LiCoO2/graphite battery charged to 4.4 V," Journal of Power Sources, vol. 323, Aug. 15, 2016, pp. 29-36 (Year: 2016).*

(Continued)

*Primary Examiner* — Ula C Ruddock
*Assistant Examiner* — Sarika Gupta
(74) *Attorney, Agent, or Firm* — Sterne, Kessler, Goldstein & Fox P.L.L.C.

(57) ABSTRACT

The present invention is directed to aqueous solid state electrolytes that comprises an oxidative additive to stabilize the interface between the cathode and aqueous electrolyte. The present invention is also directed to methods of making the solid state electrolyte materials and methods of using the solid state electrolyte materials in batteries and other electrochemical technologies.

9 Claims, 10 Drawing Sheets

(51) Int. Cl.
- H01M 4/04 (2006.01)
- H01M 4/36 (2006.01)
- H01M 4/525 (2010.01)
- H01M 10/0525 (2010.01)

(52) U.S. Cl.
CPC ....... *H01M 4/525* (2013.01); *H01M 10/0525* (2013.01); *H01M 2004/028* (2013.01)

(58) Field of Classification Search
CPC ....... H01M 2004/028; H01M 10/0567; H01M 2300/0002; H01M 2300/0088; H01M 4/505; H01M 4/5825; H01M 10/056; H01M 10/36; Y02E 60/10
See application file for complete search history.

(56) References Cited

U.S. PATENT DOCUMENTS

| | | | |
|---|---|---|---|
| 2010/0297510 A1 | 11/2010 | Kim et al. | |
| 2013/0266867 A1 | 10/2013 | Chang et al. | |
| 2013/0288125 A1* | 10/2013 | Sheem | H01M 10/0431 205/59 |
| 2015/0318530 A1* | 11/2015 | Yushin | H01M 10/36 429/131 |
| 2016/0254572 A1* | 9/2016 | Yu | H01M 4/661 429/126 |

OTHER PUBLICATIONS

Lin et al., "Improving cyclic stability and rate capability of LiNi0.5Mn1.5O4 cathode via protective film and conductive polymer formed from thiophene," J. Solid State Electrochem., p. 1123-1132, published Jan. 10, 2015 (Year: 2015).*

Chen, Z., and Dahn, J.R., "Methods to Obtain Excellent Capacity Retention in LiCoO$_2$ Cycled to 4.5 V," *Electrochimica Acta* 49(7):1079-1090, Elsevier, Netherlands (2004).

Dunn, B., et al., "Electrical Energy Storage for the Grid: a Battery of Choices," *Science* 334(6058):928-935, American Association for the Advancement of Science, United States (2011).

Han, Y.K., et al., "Why is tris(trimethylsilyl) phosphite effective as an additive for high-voltage lithium-ion batteries?," *J Mater Chem A* 3(20):10900-10909, Royal Society of Chemistry, United Kingdom (2015).

He, J.W., et al., "X-ray Photoelectron Spectroscopic Characterization of Ultra-Thin Silicon Oxide Films on a Mo(100) Surface," *Surface Science* 279(1-2):119-126, Elsevier Science Publishers B.V., Netherlands (1992).

International Search Report and Written Opinion for International Application No. PCT/US2017/067647, ISA/US, Alexandria, VA, mailed on Mar. 1, 2018, 9 pages.

Lee, J.N., et al., "N-(Triphenylphosphoranylidene) Aniline as a Novel Electrolyte Additive for High Voltage LiCoO$_2$ Operations in Lithium Ion Batteries," *Electrochimica Acta* 56(2011):5195-5200, Elsevier Ltd., United Kingdom (2011).

Li, J., et al., "Tris(trimethylsilyl)borate as an Electrolyte Additive for Improving Interfacial Stability of High Voltage Layered Lithium-Rich Oxide Cathode/Carbonate-Based Electrolyte," *Journal of Power Sources* 285:360-366, Elsevier B.V., Netherlands (2015).

Liao, X., et al., "Application of Tris(trimethylsilyl)borate to Suppress Self-Discharge of layered Nickel Cobalt Manganese Oxide for High Energy Battery," *Applied Energy* 175:505-511, Elsevier Ltd., United Kingdom (Aug. 2016).

Manickam, M., et al., "Redox Behavior and Surface Characterization of LiFePO$_4$ in Lithium Hydroxide Electrolyte," *Journal of Power Sources* 158(1):646-649, Elsevier B. V., Netherlands (2006).

Ramanujapuram, A., et al., "Degradation and Stabilization of Lithium Cobalt Oxide in Aqueous Electrolytes," *Energy and Environmental Science* 9:1841-1848, the Royal Society of Chemistry, United Kingdom (Apr. 2016).

Ruffo, R., et al., "Electrochemical Characterization of LiCoO$_2$ as Rechargeable Electrode in Aqueous LiNO$_3$ Electrolyte," *Solid State Ionics* 192(1):289-292, Elsevier B.V., Netherlands (2011).

Wang, Y., et al., "Surface Chemistry of Boron Oxidation. 1. Reactions of Oxygen and Water With Boron Films Grown on Tantalum(110)," *Chemistry of Materials* 5(2):192-198, American Chemical Society, United States (1993).

Xu, K., "Electrolytes and Interphases in Li-Ion Batteries and Beyond," *Chemical Reviews* 114(23):11503-11618, American Chemical Society Publications, United States (2014).

Zhu, Y.R., and Yi, T.F., "Recent Progress in the Electrolytes for Improving the Cycling Stability of LiNi$_{0.5}$Mn$_{1.5}$O$_4$ High-Voltage Cathode," *Ionics* 22:1759-1774, Springer-Verlag, Germany (Aug. 2016).

* cited by examiner

CATHODE STABILIZATION METHOD USING ELECTROCHEMICAL OXIDATIVE ADDITIVES IN AQUEOUS ALKALI-ION BATTERIES

STATEMENT REGARDING FEDERALLY SPONSORED RESEARCH OR DEVELOPMENT

This invention was made with government support under DEAR0000389 awarded by the Department of Energy. The government has certain rights to this invention.

BACKGROUND OF THE INVENTION

Field of the Invention

The present invention is directed to aqueous solid state electrolytes that comprises an oxidative additive to stabilize the interface between the cathode and aqueous electrolyte. The present invention is also directed to methods of making the solid state electrolyte materials and methods of using the solid state electrolyte materials in batteries and other electrochemical technologies.

Background

Aqueous lithium ion batteries (ALIBs) attract attention due to the intrinsic non-flammable nature introduced by the aqueous electrolytes therein. See Li, W., et al., Science 264:1115-1118 (1994). Due to their aqueous content, it is possible to avoid the rigorous moisture-free manufacturing environment and heavy reliance on the battery management systems necessary at the module or pack levels. See Dunn, B., et al., Science 334:928-935 (2011). Despite these advantages, the practical application of ALIBs remains remote, primarily limited by the inferior energy densities that are imposed by the narrow electrochemical stability window of water (1.23 V). See Lux, S. F., et al., J. Electrochem. Soc. 160:A1694-A1700 (2013). Recently, the electrochemical stability window of an aqueous electrolyte was shown to be able to expand significantly at high salt concentrations via the formation of an interphase on the anode surface and suppression of the electrochemical activity of water. Suo, L., et al., Science 350:938-943 (2015). The stability window of 3.0 V (1.9-4.9 V vs. Li) provides unprecedented flexibility in selecting electrochemical couples, allowing the use of many electrode materials that were otherwise forbidden in conventional aqueous electrolytes. Hence, identifying electrodes with suitable lithiation/delithiation potentials, as well as stability for this new class of aqueous electrolytes becomes a new challenge in maximizing the deliverable energy density of a full aqueous Li-ion battery.

While spinel-structured $LiMn_2O_4$ suffers from poor cycling stability (See Tang, W., et al., Energy Environ. Sci. 5:6909-6913 (2012)), and olivine-structured $LiFePO_4$ is characterized by typically low potential/low energy density (See Manickam, M., et al., Power Sources 158:646-649 (2006)), layered $LiCoO_2$ has been a reliable cathode material since the birth of Li-ion batteries, delivering a usable reversible capacity of ~140 mAh/g when charged to 4.2 V vs. Li (See Chen, Z., et al., Electrochim. Acta 49:1079-1090 (2004)), corresponding to 50% lithium removal to $Li_{0.5}CoO_2$. This low voltage $LiCoO_2$ (LVLCO) has maintained the status of flagship chemistry due to the excellent cycling stability (See Ruffo, Re., et al., Solid State Ionics 192:289-292 (2011)); however, when efforts were made to remove more than 0.5 fraction of lithium by charging up to 4.5 V vs. Li, the layered structure became destabilized, and Co-dissolution accompanied by extensive electrolyte decomposition resulted in deteriorated cycling stabilities.

Although the lithiation/delithiation potential of LVLCO rests within the electrochemical stability window of the normal aqueous electrolyte, the LVLCO still suffers from poor cycling stability due to side reactions including the intercalation of proton into LVLCO (See Gu, X., et al., J. Phys. Chem. C 115:12672-12676 (2011)), the reactions between the LVLCO and dissolved oxygen in the electrolyte (See Luo, J.-Y., et al., Nat. Chem. 2:760-765 (2010)), the dissolution of Co into electrolyte (See Aurbach, D., et al., Electrochim. Acta 47:4291-4306 (2002)), and oxygen-evolution due to oxidation of water. On the other hand, the full electrochemical stability window of a water-in-salt electrolyte, with anodic limit at 4.9 V vs. Li, is actually not fully used by a LVLCO that is charged to only 4.2 V vs. Li. Recent efforts have been made to charge $LiCoO_2$ to 4.5 V vs. Li in order to utilize more capacity from this cathode, and a capacity of ~180 mAh/g (corresponding to 0.7 fraction of Li removed, defined as HVLCO) was reported in organic electrolytes without structural destruction (See Chen, Z., et al., Electrochim. Acta 49:1079-1090 (2004)). However, the attained capacity of HVLCO gradually was found to decay during charge/discharge cycles due to the growth of surface impedance. It was believed that both Co-dissolution into electrolytes and other side reactions between $Li_{0.3}CoO_2$ and electrolytes were responsible for the poor cycling stability. Surface coating or formation of cathode electrolyte interphases (cathode SEI) on $LiCoO_2$ can effectively suppress these parasitic processes and significantly enhance the capacity retention of HVLCO. It is believed that the formation of a cathode SEI was supported by the oxidative decomposition of non-aqueous solvents, which provided chemical building blocks in a similar manner as they did in the formation of solid electrolyte interphase (SEI) on anode. (See Gauthier, M., et al., J. Phys. Chem. Lett. 6:4653-4672 (2015)). Such chemical source, however, is absent in aqueous electrolytes, as the oxidation of neither solvent (water) nor salt anion leads to dense solid deposition on electrode surface. Therefore, a third component responsible for interphase would need to be introduced.

In contrast to non-aqueous electrolyte systems where cathode and anode materials often operate far beyond thermodynamic stability limits of electrolyte components (K. Xu, Chem. Rev. 104, 4303-4417 (2004); and K. Xu, Chem. Rev. 114, 11503-11618 (2014)), kinetic protection from a SEI in aqueous media is more difficult to achieve. Such interphases, occurring between electrode surfaces and electrolyte, are formed by sacrificial electrolyte decomposition during the initial charging, and constitute a barrier allowing ionic conduction but forbidding electronic conduction. Their presence significantly expands the usable electrochemical stability window of electrolytes. The absence of a protective interphase in conventional aqueous electrolytes is because none of the decomposition products from water ($H_2$, $O_2$, or $OH$) can deposit in dense solid state. In the absence of interphases, aqueous Li-ion batteries were typically limited to low voltage (<1.5 V) and low energy density (<70 Wh/Kg), often with rapid capacity fading and low Coulombic efficiency. The latter became especially pronounced at low C rates.

While the use of additives have been very popular in tailoring SEI on anode surfaces, recently, additives designed for cathode protection have also been reported. (See Lee., J.-N., et al., *Electrochim. Acta* 56:5195-5200 (2011)). However, additives have not been used in aqueous electrolyte systems.

There is a need to increase the interfacial contact between the solid state electrolyte and cathode materials. Thus, there is a need for improved solid state electrolytes for use in aqueous lithium ion batteries.

BRIEF SUMMARY OF THE INVENTION

The present disclosure provides a cathode comprising:
(a) a cathode active material; and
(b) a solid electrolyte interphase layer;
wherein the solid electrolyte interface layer covers the cathode active material.

In some embodiments, the cathode active material is a lithium metal oxide or a lithium metal phosphate.

In some embodiments, the cathode active material is a lithium metal oxide comprising Co, Ni, Mn, or Fe as a transition metal.

In some embodiments, the cathode active material is a lithium metal phosphate comprising Co, Ni, Mn, or Fe as a transition metal.

In some embodiments, the cathode active material is selected from the group consisting of $LiFePO_4$, $LiMn_2O_4$, $LiCoO_2$, $LiNi_{0.33}Mn_{0.33}CO_{0.33}O_2$, $LiNi_{0.6}Mn_{0.2}Co_{0.2}O_2$, $LiNi_{0.8}Mn_{0.1}Co_{0.1}O_2$, $LiNi_{0.5}Mn_{1.5}O_4$, $LiNi_{0.8}Co_{0.15}Al_{0.05}O_2$, and $LiMnPO_4$.

In some embodiments, the cathode active material is $LiCoO_2$.

In some embodiments, the solid electrolyte interphase layer is a decomposition product of at least one oxidative additive.

In some embodiments, the at least one oxidative additive is selected from the group consisting of an aromatic compound, a thiophene, a furan, a pyrrole, a phosphate, a silane, a borate, and a derivative thereof.

In some embodiments, the at least one oxidative additive is selected from the group consisting of biphenyl, aniline, 2,2-diphenylpropane, t-butylbenzene, cyclohexylbenzene, thiophene, 3-chlorothiophene, 3-hexylthiophene, furan, furfural, benzofuran, pyrrole, indole, tris(trimethylsilyl)phosphate, tris(hexafluoroisopropyl)phosphate, triallyl phosphate, N,N-diethylamino trimethyl silane, tris(pentafluorophenyl)silane, phenyl tris-2-methoxydiethoxy silane, tris(trimethylsilyl)borate, lithium bis(oxalate)borate, trimethyl borate, and triethyl borate.

In some embodiments, the at least one oxidative additive is tris(trimethylsilyl)borate.

In some embodiments, the solid electrolyte interphase layers covers between about 40% and about 100% of the cathode active material.

The present disclosure provides an electrochemical cell comprising:
(a) an anode;
(b) a cathode; and
(c) an aqueous or a hybrid electrolyte;
wherein the cathode comprises a solid electrolyte interphase layer that covers a cathode active material.

In some embodiments, the cathode active material in the cathode of the electrochemical cell is a lithium metal oxide or a lithium metal phosphate.

In some embodiments, the cathode active material in the cathode of the electrochemical cell is a lithium metal oxide comprising Co, Ni, Mn, or Fe as a transition metal.

In some embodiments, the cathode active material in the cathode of the electrochemical cell is a lithium metal phosphate comprising Co, Ni, Mn, or Fe as a transition metal.

In some embodiments, the cathode active material in the cathode of the electrochemical cell is selected from the group consisting of $LiFePO_4$, $LiMn_2O_4$, $LiCoO_2$, $LiNi_{0.33}Mn_{0.33}Co_{0.33}O_2$, $LiNi_{0.6}Mn_{0.2}Co_{0.2}O_2$, $LiNi_{0.8}Mn_{0.1}Co_{0.1}O_2$, $LiNi_{0.5}Mn_{1.5}O_4$, $LiNi_{0.8}Co_{0.15}Al_{0.05}O_2$, and $LiMnPO_4$.

In some embodiments, the cathode active material in the cathode of the electrochemical cell is $LiCoO_2$.

In some embodiments, the solid electrolyte interphase layer that covers the cathode in the electrochemical cell is a decomposition product of at least one oxidative additive.

In some embodiments, the at least one oxidative additive that decomposes to form a solid electrolyte interphase layer that covers the cathode in the electrochemical cell is selected from the group consisting of an aromatic compound, a thiophene, a furan, a pyrrole, a phosphate, a silane, a borate, and a derivative thereof.

In some embodiments, the at least one oxidative additive that decomposes to form a solid electrolyte interphase layer that covers the cathode in the electrochemical cell is selected from the group consisting of biphenyl, aniline, 2,2-diphenylpropane, t-butylbenzene, cyclohexylbenzene, thiophene, 3-chlorothiophene, 3-hexylthiophene, furan, furfural, benzofuran, pyrrole, indole, tris(trimethylsilyl)phosphate, tris(hexafluoroisopropyl)phosphate, triallyl phosphate, N,N-diethylamino trimethyl silane, tris(pentafluorophenyl)silane, phenyl tris-2-methoxydiethoxy silane, tris(trimethylsilyl)borate, lithium bis(oxalate)borate, trimethyl borate, and triethyl borate.

In some embodiments, the at least one oxidative additive that decomposes to form a solid electrolyte interphase layer that covers the cathode in the electrochemical cell is tris(trimethylsilyl)borate.

In some embodiments, the electrochemical cell comprises between about 0.05% and about 20% mass percentage of the at least one oxidative additive, wherein the mass percentage is measured by total mass of the oxidative additive and the aqueous or hybrid electrolyte.

In some embodiments, the solid electrolyte interphase layers covers between about 40% and about 100% of the cathode active material.

In some embodiments, the aqueous or hybrid electrolyte of the electrochemical cell is a water-in-salt electrolyte.

In some embodiments, the aqueous or hybrid electrolyte of the electrochemical cell is selected from the group consisting of $LiN(SO_2CF_3)_2$, $LiN(SO_2CH_3)_2$, $LiN(SO_2C_4H_9)_2$, $LiN(SO_2C_2F_5)_2$, $LiN(SO_2C_4F_9)_2$, $LiN(SO_2F_3)(SO_2C_4F_9)$, $LiN(SO_2C_2F_5)(SO_2C_4F_9)$, $LiN(SO_2C_2F_4SO_2)$, $LiN(SO_2F)_2$, and $LiN(SO_2F)(SO_2CF_3)$.

In some embodiments, the aqueous or hybrid electrolyte of the electrochemical cell is $LiN(SO_2CF_3)_2$.

In some embodiments, the anode of the electrochemical cell is selected from the group consisting of lithium, magnesium, aluminum, molybdenum, zinc, chromium, iron, nickel, tin, lead, copper, silver, palladium, mercury, platinum, gold, combinations thereof, metal alloys thereof, metal oxides thereof, metal phosphates thereof, and metal sulfides thereof.

In some embodiments, the anode of the electrochemical cell is $Mo_6S_8$.

In some embodiments, the electrochemical cell is located in a rechargeable lithium battery.

In some embodiments, the capacity decay rate (mAh/g) at a C-rate of about 2.5 C of the electrochemical cell is between about 0.005% and about 0.1% per cycle.

In some embodiments, the capacity decay rate (mAh/g) at a C-rate of about 2.5 C of the electrochemical cell is between about 0.05% and about 0.1% per cycle.

In some embodiments, the energy density at a C-rate of about 0.5 C of the electrochemical cell is between about 20 Wh/kg and about 200 Wh/kg.

In some embodiments, the energy density at a C-rate of about 0.5 C of the electrochemical cell is between about 120 Wh/kg and about 150 Wh/kg.

The present disclosure provides a process for preparing a cathode for an electrochemical device comprising:
(a) providing a cathode active material;
(b) immersing the cathode active material in an aqueous or hybrid electrolyte comprising at least one oxidative additive; and
(c) charging the cathode active material to form a solid electrolyte material upon the cathode active material.

In some embodiments, the cathode active material provided is a lithium metal oxide or a lithium metal phosphate.

In some embodiments, the cathode active material provided is a lithium metal oxide comprising Co, Ni, Mn, or Fe as a transition metal.

In some embodiments, the cathode active material provided is a lithium metal phosphate comprising Co, Ni, Mn, or Fe as a transition metal.

In some embodiments, the cathode active material provided is selected from the group consisting of $LiFePO_4$, $LiMn_2O_4$, $LiCoO_2$, $LiNi_{0.33}Mn_{0.33}Co_{0.33}O_2$, $LiNi_{0.6}Mn_{0.2}Co_{0.2}O_2$, $LiNi_{0.8}Mn_{0.1}Co_{0.1}O_2$, $LiNi_{0.5}Mn_{1.5}O_4$, $LiNi_{0.8}Co_{0.15}Al_{0.05}O_2$, and $LiMnPO_4$.

In some embodiments, the cathode active material provided is $LiCoO_2$.

In some embodiments, the at least one oxidative additive in the aqueous or hybrid electrolyte is selected from the group consisting of an aromatic compound, a thiophene, a furan, a pyrrole, a phosphate, a silane, a borate, and a derivative thereof.

In some embodiments, the at least one oxidative additive in the aqueous or hybrid electrolyte is selected from the group consisting of biphenyl, aniline, 2,2-diphenylpropane, t-butylbenzene, cyclohexylbenzene, thiophene, 3-chlorothiophene, 3-hexylthiophene, furan, furfural, benzofuran, pyrrole, indole, tris(trimethylsilyl)phosphate, tris(hexafluoroisopropyl)phosphate, triallyl phosphate, N,N-diethylamino trimethyl silane, tris(pentafluorophenyl)silane, phenyl tris-2-methoxydiethoxy silane, tris(trimethylsilyl)borate, lithium bis(oxalate)borate, trimethyl borate, and triethyl borate.

In some embodiments, the at least one oxidative additive in the aqueous or hybrid electrolyte is tris(trimethylsilyl) borate.

In some embodiments, the solid electrolyte interphase layer covers between about 40% and about 100% of the cathode active material.

In some embodiments, the aqueous or hybrid electrolyte comprises between about 0.05% and about 20% mass percentage of the at least one oxidative additive, wherein the mass percentage is measured by total mass of the oxidative additive and the aqueous or hybrid electrolyte.

DETAILED DESCRIPTION OF THE INVENTION

Figure 1A:
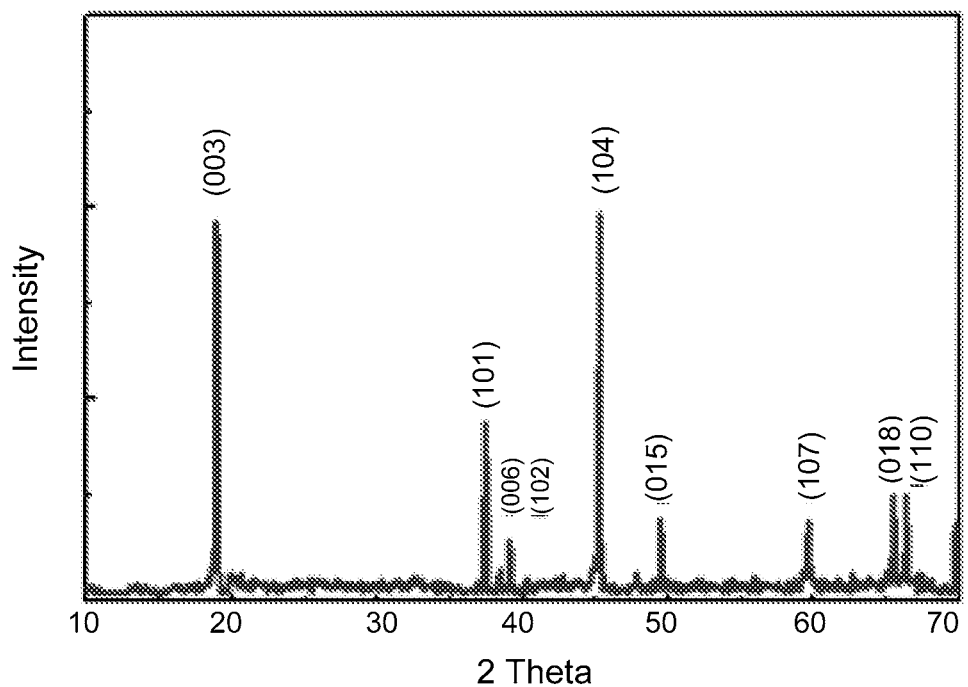
FIG. 1A is an X-ray diffraction spectra of pristine $LiCoO_2$ powder. All peaks in the X-ray diffraction spectra can be indexed to the hexagonally packed $O_3$ layered structure with an R3m space group.

As used herein, the singular terms "a" and "the" are synonymous and used interchangeably with "one or more" and "at least one," unless the language and/or context clearly indicates otherwise.

All numbers in this description indicating amounts, ratios of material, physical properties of materials and/or use are to be understood as modified by the word "about," except otherwise explicitly indicated.

The term "about" is used herein to mean the given number plus or minus 1 to 10%.

The term "aqueous electrolyte" as used herein, refers to an electrolyte composition that contains water as the only solvent.

The term "aqueous-based electrolyte" or "hybrid electrolyte" refers to an electrolyte composition that contains water and at least one non-aqueous solvent. In some embodiments, the content of water in the hybrid electrolyte is between 1% and 99%.

The term "non-aqueous electrolyte" refers to an electrolyte composition that contains aprotic or protic solvents in which the content of water is less than 1%.

The term "cathode" is used herein to refer to the electrode where electrochemical reduction occurs during the discharging process.

The term "anode" is used herein to refer to the electrode where electrochemical oxidation occurs during the discharging process.

The "molality" (m) of a solution is defined as the amount of substance (in moles) of solute, $n_{solute}$, divided by the mass (in kg) of the solvent, $m_{solvent}$.

$$\text{molality} = n_{solute}/m_{solvent}$$

The unit for molality (m) is moles per kilogram (mol/kg).

The present disclosure relates to a method for stabilizing the interface between a cathode and an aqueous or hybrid electrolyte by the formation of a solid electrolyte interface (SEI) in the aqueous system. In ALIBs, the cathode will usually suffer from reactions between the active material and dissolved oxygen, dissolution of the surface element, and decomposition of the electrolyte. The stability of the high voltage cathode in the aqueous or hybrid electrolyte will decrease at higher cut-off voltage and therefore, the interfacial stability between the cathode and the aqueous or hybrid electrolyte should be addressed in order to achieve a high energy aqueous battery.

Unlike the anode part, where aprotic electrolytes are thermodynamically unstable against electrochemical reduction and the formation of a SEI is critical to passivate the electrode surface and enable high Coulombic efficiency to be obtained, there is no thermodynamic driving force for electrolyte oxidation on most conventional cathode materials. Thus, the present disclosure uses an oxidative additive in the aqueous or hybrid electrolyte to form a SEI on the cathode surface.

In some embodiments, the present disclosure provides mixtures of the oxidative additive and a cathode active material, cathodes containing the oxidative additive, electrochemical cells with cathodes containing the oxidative additive, rechargeable batteries with cathodes containing the oxidative additive, and methods of forming a solid electrolyte interface on a cathode.

Cathode

In some embodiments, the present disclosure provides a cathode (negative electrode) comprising:
(a) a cathode active material; and
(b) a solid electrolyte interphase layer;
wherein the solid electrolyte interphase layer is coated on the cathode active material.

In some embodiments, the cathode active material comprises a metal selected from the group consisting of ferrate, iron oxide, cuprous oxide, iodate, cupric oxide, mercuric oxide, cobaltic oxide, manganese dioxide, lead oxide, oxygen, lithium oxide, nickel oxyhydroxide, nickel dioxide, silver peroxide, permanganate, and bromate.

In some embodiments, the cathode is a lithium metal oxide. In some embodiments, the cathode is a lithium metal phosphate. A lithium metal oxide or lithium metal phosphate is a composite of lithium oxide or lithium phosphate with a transition metal. In some embodiments, the cathode is a lithium metal oxide comprising Ni, Co, Mn, or Fe as the transition metal. In some embodiments, the cathode is a lithium metal phosphate comprising Ni, Co, Mn, or Fe as the transition metal. In some embodiments, the cathode is a lithium metal oxide comprising Ni, Co, or Mn as the transition metal. In some embodiments, the cathode is a lithium metal oxide comprising Ni, Co, or Mn as the transition metal.

In some embodiments, the cathode is selected from the group consisting of $LiCoO_2$, $LiNi_{0.33}Ni_{0.33}Mn_{0.33}Co_{0.33}O_2$, $LiNi_{0.5}Mn_{1.5}O_2$, $LiCoPO_4$, $LiNiPO_4$, metal oxides, metal phosphates, conversion-reaction materials based on metal oxides, metal halides, and metal sulfides. In some embodiments, the cathode is selected from the group consisting of $LiFePO_4$, $LiMn_2O_4$, $LiCoO_2$, $LiNi_{0.33}Mn_{0.33}Co_{0.33}O_2$, $LiNi_{0.6}Mn_{0.2}Co_{0.2}O_2$, $LiNi_{0.8}Mn_{0.1}Co_{0.1}O_2$, $LiNi_{0.5}Mn_{1.5}O_4$, $LiNi_{0.8}Co_{0.15}Al_{0.05}O_2$, and $LiMnPO4$. In some embodiments, the cathode is $LiCoO_2$.

In some embodiments, the cathode further comprises a cathode conductive aid, a carbon particle, a binder, or combinations thereof.

Oxidative Additive

In some embodiments, the oxidative additive is a compound that can be oxidized to form a film on the surface of the active cathode material. In some embodiments, the oxidative additive possesses the following properties: (1) the additive itself must possesses lower oxidation potential than the water in the aqueous or hybrid electrolyte, which is ca. 4.9 V vs. Li; and (2) the additive itself must remain chemically stable against water (non-hydrolysable).

In some embodiments, the oxidative additive is an aromatic compound, a thiophene, a furan, a pyrrole, a phosphate, a silane, a borate, or derivatives thereof.

In some embodiments, the oxidative additive is an aromatic compound. As used herein, the term "aromatic compound" refers to an organic compound comprising at least one unsaturated cyclic group having 4n+2 delocalized pi electrons. The term is intended to encompass both hydrocarbon aromatic compounds and heteroaromatic compounds. The term "hydrocarbon aromatic compound" refers to a compound in which the aromatic moieties have only carbon and hydrogen atoms. The term "heteroaromatic compound" refers to a compound wherein in at least one aromatic moiety one or more of the carbon atoms within the cyclic group has been replaced by another atom, such as nitrogen, oxygen, or sulfur. In some embodiments, the oxidative additive is an aromatic compound such as biphenyl, aniline, 2,2-diphenylpropane, tert-butylbenzene, or cyclohexylbenzene.

In some embodiments, the oxidative additive is a thiophene or a thiophene derivative. In some embodiments, the oxidative additive is a thiophene or thiophene derivative such as thiophene, 3-chlorothiophene, or 3-hexylthiophene.

In some embodiments, the oxidative additive is a furan or a furan derivative. In some embodiments, the oxidative additive is a furan or a furan derivative such as furan, furfural, or benzofuran.

In some embodiments, the oxidative additive is a pyrrole or a pyrrole derivative. In some embodiments, the oxidative additive is a pyrrole or pyrrole derivative such as pyrrole or indole.

In some embodiments, the oxidative additive is a phosphate. In some embodiments, the oxidative additive is a phosphate such as tris(trimethylsilyl)phosphate, tris(hexafluoroisopropyl)phosphate, or triallyl phosphate.

In some embodiments, the oxidative additive is a silane. In some embodiments, the oxidative additive is a silane such as N,N-diethylamino trimethylsilane, tris(pentafluorophenyl)silane, or phenyl tris-2-methoxydiethoxy silane.

In some embodiments, the oxidative additive is a borate. In some embodiments, the oxidative additive is a borate such as tris(trimethylsilyl)borate, lithium bis(oxalate)borate, trimethyl borate, or triethyl borate. In some embodiments, the oxidative additive is a tris(trialkylsilyl) borate, wherein alkyl is a $C_1$-$C_3$ alkyl. In some embodiments, the oxidative additive is tris(trimethylsilyl)borate.

In some embodiments, the amount of the at least one oxidative additive as a mass percentage of the electrolyte is between about 0.05% and about 20%, about 0.05% and about 10%, about 0.05% and about 5%, about 0.05% and about 2%, about 0.05% and about 1%, about 0.05% and about 0.5%, about 0.05% and about 0.1%, about 0.1% and about 20%, about 0.1% and about 10%, about 0.1% and about 5%, about 0.1% and about 2%, about 0.1% and about 1%, about 0.1% and about 0.5%, about 0.5% and about 20%, about 0.5% and about 10%, about 0.5% and about 5%, about 0.5% and about 2%, about 0.5% and about 1%, about 1% and about 20%, about 1% and about 10%, about 1% and about 5%, about 1% and about 2%, about 2% and about 20%, about 2% and about 10%, about 2% and about 5%, about 5% and about 20%, about 5% and about 10%, or about 10% and about 20%. In some embodiments, the at least one oxidative additive as a mass percentage of the electrolyte is between about 0.5% and about 2%.

In some embodiments, the oxidative additive decomposes in the aqueous or hybrid electrolyte and forms a solid electrolyte interphase layer on the cathode active material. In some embodiments, the solid electrolyte interphase layer covers between about 40% and about 100%, about 40% and about 90%, about 40% and about 80%, about 40% and about 60%, about 60% and about 100%, about 60% and about 90%, about 60% and about 80%, about 80% and about 100%, about 80% and about 90%, or about 90% and about 100% of the cathode active material.

In some embodiments, when the oxidative additive is added to a cathode active material, the oxidative additive provides an initial reversible capacity increase corresponding to at least 50%, at least 60%, at least 70%, or at least 80% of the oxidative additive theoretical capacity of the oxidative additive.

Electrochemical Cells

An electrochemical cell comprises two half-cells. Each half-cell comprises an electrode and an electrolyte. The two half-cells can use the same electrolyte, or they can use different electrolytes. The chemical reactions in the cell may involve the electrolyte, the electrodes, or an external substance (as in fuel cells that may use hydrogen gas as a reactant). In a full electrochemical cell, species from one half-cell lose electrons (oxidation reaction) to their electrode while species from the other half-cell gain electrons (reduction reaction) from their electrode.

An electrochemical cell includes two electrodes, a positive electrode, called the cathode and, a negative electrode, called the anode, an insulator separating the electrodes so the battery does not short out, and an electrolyte that transports the ionic component of the chemical reaction between the two electrodes and forces the electronic component to be transported outside the cell. The anode is the reductant of the chemical reaction, the cathode the oxidant, so on discharge electrons flow from the anode to the cathode and are charge-compensated by cations flowing inside the cell from the anode to the cathode. This process transforms the chemical energy of the reaction into electric power in the external circuit by delivering a current at a voltage for a time $A_t$ until the chemical reaction is completed. If the charged cell has the electric current cut off, which is called an open-circuit, electrons cannot flow, but the ions inside the cell can flow without being charge-compensated. As a result, the cathode becomes positively charged on open-circuit, which is why the cathode is called the positive electrode.

In some embodiments, the present invention provides an electrochemical cell comprising:
 (a) an anode;
 (b) a cathode; and
 (c) an aqueous or hybrid electrolyte;
 wherein the cathode comprises a solid electrolyte interphase layer that covers a cathode active material.

The anode (positive electrode) used in the electrochemical cell can be any suitable anode. In some embodiments, the anode (positive electrode) of the electrochemical cell comprises a metal selected from the group consisting of lithium, magnesium, molybdenum, aluminum, zinc, chromium, iron, nickel, tin, lead, copper, silver, palladium, mercury, platinum, gold, and combinations thereof; metal alloys; metal oxides; graphite or another carbon of varying degrees of graphitization; phosphates; and sulfides. In some embodiments, the anode is $Mo_6S_8$.

In some embodiments, the anode comprises more than one anode active material. In some embodiments, the anode comprises 1, 2, 3, or 4 active materials. In some embodiments, the anode comprises 1 anode active material. In some embodiments, the anode comprises other materials in addition to the anode active material including a metal sheet, a binder, a conductivity enhancer, and combinations thereof.

The electrolyte used in the electrochemical cell can be any electrolyte suitable for use at the voltage dictated by the cathode and the anode. In some embodiments, the anode and cathode cell contain the same electrolyte. In some embodiments, the anode and cathode cell contain different electrolytes.

In some embodiments, the electrolyte is an aqueous electrolyte. In some embodiments, a significant (non-trace) amount of water is incorporated in the electrolyte. In some embodiments the volume percent of water in the electrolyte relative to the total liquid solvent volume is greater than 5%, 10%, 20%, 30%, 40%, 50%, 60%, 70%, 80%, or 90%. In some embodiments water is the only liquid solvent in the electrolyte (i.e., water constitutes 100% of the solvent volume of the electrolyte). In some embodiments, the aqueous electrolyte comprises $LiPF_6$ or $LiSO_3CF_3$.

In some embodiments, the electrolyte is a hybrid electrolyte. In some embodiments, the hybrid electrolyte further comprises one or more non-aqueous solvents. In some embodiments, the volume percent of non-aqueous solvents in the hybrid electrolyte is between about 1% and about 10%, about 10% and about 20%, about 20% and about 30%, about 30% and about 40%, about 40% and about 50%, about 50% and about 60%, about 60% and about 70%, about 70% and about 80%, or about 80% and about 90%. In some embodiments, the non-aqueous solvent is a aprotic, protic organic solvents (solids and liquids, typically liquids or solid polyethylene oxide), or ionic liquid. In some embodiments, the non-aqueous solvent is a protic organic solvent.

In some embodiments, the aqueous electrolyte is a water-in-salt electrolyte. As used herein, the term "water-in-salt" means that the weight ratio of salt to solvent or volume ratio of salt to solvent exceed 1.0. In some embodiments, the weight or volume of salt is more than solvent. In some embodiments, the water-in-salt electrolyte is a sulfone-based electrolyte such as $LiN(SO_2CF_3)_2$ (LiTFSI), $LiN(SO_2CH_3)_2$, $LiN(SO_2C_4H_9)_2$, $LiN(SO_2C_2F_5)_2$ (LiBETI), $LiN(SO_2C_4F_9)_2$, $LiN(SO_2F_3)(SO_2C_4F_9)$, $LiN(SO_2C_2F_5)(SO_2C_4F_9)$, $LiN(SO_2C_2F_4SO_2)$, $LiN(SO_2F)_2$ (LiFSI), or $LiN(SO_2F)(SO_2CF_3)$(LiFTI). In some embodiments, the aqueous electrolyte comprises $LiN(SO_2CF_3)_2$. In some embodiments, the aqueous electrolyte is a water-in-Mg-salt electrolyte. In some embodiments, the water-in-Mg-salt electrolyte comprises $LiSO_4$—$MgSO_4$, LiCl—$MgCl_2$, or $Li(NO_3)$—$Mg(NO_3)_2$.

In some embodiments, the electrochemical cell includes a separator between the positive electrode and the negative electrode. In some embodiments, the separator is subjected to hydrophilic treatment or perforated such that the separator can be permeated with an aqueous electrolyte solution, allowing ions to pass through the separator. The separator may be any separator that is commonly used in batteries. Examples of the separator include polymer nonwoven fabrics, such as polypropylene nonwoven fabric and poly (phenylene sulfide) nonwoven fabric, and macroporous membranes of olefin resins, such as polyethylene and polypropylene. These can be used alone or in combination. In some embodiments, the separator is a glass fiber.

Electrochemical Devices

In some embodiments, electrochemical devices that operate using oxidative additives are fabricated using techniques known to those of ordinary skill in the art. In some embodiments, the electrochemical device is a battery.

Batteries are divided into two principal types, primary batteries and secondary batteries. Primary batteries are used once and are then exhausted. Secondary batteries are also often called rechargeable batteries because, after use, they may be recharged, then used again. In rechargeable batteries, each charge/discharge process is called a cycle. Rechargeable batteries eventually reach an end of their usable life, but typically only after many charge/discharge cycles.

A rechargeable battery includes an electrochemical cell and optionally other materials, such as a casing to protect the cell and wires or other connectors to allow the battery to interface with the outside world.

The cation that is transported between the electrodes by the electrolyte is called the "working ion." A rechargeable battery is named after the working cation. For example, the positive ion in a lithium secondary battery is the lithium ion ($Li^+$). In a sodium secondary battery it is the sodium ion ($Na^+$).

To recharge the battery, electrons flow from the cathode to the anode by the application of electric power. By supplying electric energy to the battery, electrons are induced to leave the cathode and enter the anode. To keep the overall charge neutral in the cathode and anode, a positive ion leaves the cathode and enters the electrolyte, and a positive ion also leaves the electrolyte and enters the anode. The efficiency of electrical-energy storage in a rechargeable battery depends on the reversibility of the chemical reaction between the two electrodes.

Because the ionic conductivity in the electrolyte is many times smaller than the electronic conductivity in the electrode, a battery has large-area electrodes that are separated by a thin electrolyte. Therefore, the electrodes do not need to be thick, and, their electronic conductivity does not need to be high so long as they make contact with a metallic current collector. Consequently, in addition to containing an active material that exchanges electrons and ions, anodes and cathodes may contain other materials in addition to a metal backing to which a slurry of the active material is applied and dried. The slurry often contains, in addition to the active material, a binder to help it adhere to the backing and conductive materials, such as carbon particles. Once the slurry dries, it forms a coating on the metal backing.

The present disclosure also provides methods of manufacture of the aqueous electrolyte battery. In some embodiments, the method involves de-oxygenating the electrolyte and forming and sealing the cell in an inert or reducing environment devoid of molecular oxygen (e.g., a nitrogen environment) in order to reduce or eliminate free oxygen in the electrolyte solution. In this way the irreversible oxidation in the aqueous electrolyte and the resultant loss of material, is avoided.

In some embodiments, the cells are self-contained and sealed in a hermetic casing wherein the entirety of the cell is derived from and disposed in the casing during cell manufacture. These fully sealed cells may be secondary cells. In some embodiments, the casing comprises one layer. In some embodiments, the casing comprises more than one layer. In some embodiments, the casing comprises at least one layer selected from a polyethylene terephthalate layer, a polymer layer, and a propylene layer. In some embodiments, the casing comprises at least one carbonized plastic layer.

In some embodiments, the cells are configured in a battery flow cell system, wherein the aqueous electrolyte is caused to flow and/or circulate into the cell. In some embodiments, the aqueous or hybrid electrolyte is caused to flow and/or circulate through an inter-electrode region between the anode and the cathode. In some embodiments, the electrolyte in the anode and the cathode are flowable and during operation are caused to flow through the cell.

In some embodiments, the aqueous or hybrid electrolyte battery can be of any shape, such as coin-shaped, button-shaped, sheet-shaped, layered, cylindrical, flat, or square. In some embodiments, the aqueous or hybrid secondary battery can be applied to large objects, such as electric vehicles.

In some embodiments, the aqueous or hybrid electrolyte battery is a secondary battery. In some embodiments, the secondary battery can include a single electrochemical cell or multiple electrochemical cells. Batteries with more than one cell may contain components to connect or regulate the multiple electrochemical cells.

Several important properties of rechargeable batteries include energy density, power density, capacity, particularly reversible capacity, rate capability, cycle life, thermal stability, cost, and safety. All of these properties are influenced by the choice of materials used to form the battery. The capacity of a battery is the amount of electronic charge that is transported at a constant current between the electrodes per unit weigh in the time $A_t$ for a complete discharge, and the energy density is the product of the average voltage during discharge and the capacity. Both decrease with increasing current and, therefore, power delivered. Moreover, the cycle life of a rechargeable battery is defined as the number of charge/discharge cycles before the capacity fades to 80% of its original capacity. Capacity fade is caused by a loss of the reversibility of the chemical reaction between the electrodes.

In some embodiments, battery performance can be quantified with four parameters: cell voltage, capacity, Coulombic efficiency, and cycling stability. While the first two determine the energy density, the latter two dictate the life and energy efficiency.

The "energy density" of a battery is the nominal battery energy per unit mass (Wh/kg). The energy density is the ability of a battery to store energy, i.e., a high energy density can store a lot of energy than a low energy density battery.

In some embodiments, the energy density for the battery at a low C-rate of 0.5 C is between about 20 Wh/kg and about 200 Wh/kg, about 20 Wh/kg and about 150 Wh/kg, about 20 Wh/kg and about 120 Wh/kg, about 20 Wh/kg and about 90 Wh/kg, about 20 Wh/kg and about 60 Wh/kg, about 60 Wh/kg and about 200 Wh/kg, about 60 Wh/kg and about 150 Wh/kg, about 60 Wh/kg and about 120 Wh/kg, about 60 Wh/kg and about 90 Wh/kg, about 90 Wh/kg and about 200 Wh/kg, about 90 Wh/kg and about 150 Wh/kg, about 90 Wh/kg and about 120 Wh/kg, 120 Wh/kg and about 200 Wh/kg, about 120 Wh/kg and about 150 Wh/kg, or about 150 Wh/kg and about 200 Wh/kg. In some embodiments, the energy density for the battery at a low C-rate of 0.5 C is between about 120 Wh/kg and about 150 Wh/kg.

The "cycle life" of a battery is the number of complete charge/discharge cycles that the battery is able to support before its capacity falls under 80% of its original capacity. The "C-rate" of a battery is a measure of the rate at which a battery is being discharged. A C-rate of 1 C is a one-hour discharge, a C-rate of 0.5 C is a two-hour discharge, and a C-rate of 0.2 C is a five-hour discharge.

In some embodiments, the number of cycles for the battery at a high C-rate of about 2.5 C is between about 10 and about 2000, about 10 and about 1500, about 10 and about 1000, about 10 and about 500, about 10 and about 100, about 100 and about 2000, about 100 and about 1500, about 100 and about 1000, about 100 and about 500, about 500 and about 2000, about 500 and about 1500, about 500 and about 1000, about 1000 and about 2000, about 1000 and about 1500, or between about 1500 and about 2000. In some embodiments, the number of cycles for the battery at a high C-rate of about 2.5 C is between about 10 and about 500.

The "capacity retention" of a battery is a measurement of the fraction of full capacity available from a battery under a specified set of conditions, after the battery has been stored for a given amount of time.

In some embodiments, the capacity decay rate (in mAh/g) for a battery at a high C-rate of about 2.5 C is between about 0.005% and about 0.1%, about 0.005% and about 0.05%, 0.005% and about 0.01%, about 0.01% and about 0.1%, about 0.01% and about 0.05%, or about 0.05% and about 0.01% per cycle. In some embodiments, the capacity decay rate (in mAh/g) for a battery at a high C-rate of about 2.5 C is between about 0.05% and about 0.01% per cycle.

In some embodiments, the capacity retention (in mAh/g) for a battery at a low C-rate of about 0.5 C is between about 30% and about 100%, about 30% and about 90%, about 30% and about 80%, about 30% and about 70%, about 30% and about 60%, about 60% and about 100%, about 60% and about 90%, about 60% and about 80%, about 60% and about 70%, about 70% and about 100%, about 70% and about 90%, about 70% and about 80%, about 80% and about 100%, about 80% and about 90%, or about 90% and about 100%. In some embodiments, the capacity retention (in mAh/g) for a battery at a low C-rate of about 0.5 C is between about 90% and about 100%.

In some embodiments, the number of cycles for the battery at a high C-rate of about 2.5 C is between about 10 and about 2000, about 10 and about 1500, about 10 and about 1000, about 10 and about 500, about 10 and about 100, about 100 and about 2000, about 100 and about 1500, about 100 and about 1000, about 100 and about 500, about 500 and about 2000, about 500 and about 1500, about 500 and about 1000, about 1000 and about 2000, about 1000 and about 1500, or between about 1500 and about 2000. In some embodiments, the number of cycles for the battery at a high C-rate of about 2.5 C is between about 500 and about 2000.

In some embodiments, the electrochemical cell operates at a temperature of less than about 100° C., about 90° C., about 80° C., about 70° C., about 60° C., about 50° C., about 40° C., about 30° C., about 20° C., or about 10° C. In some embodiments, the electrochemical cell operates at a temperature between about −40° C. and about 100° C., about −40° C. and about 90° C., about −40° C. and about 80° C., about −40° C. and about 70° C., about −40° C. and about 60° C., about −40° C. and about 50° C., about −40° C. and about 40° C., about −40° C. and about 30° C., about −30° C. and about 100° C., about −30° C. and about 90° C., about −30° C. and about 80° C., about −30° C. and about 70° C., about −30° C. and about 60° C., about −30° C. and about 50° C., about −30° C. and about 40° C., about −30° C. and about 30° C., about −20° C. and about 100° C., about −20° C. and about 90° C., about −20° C. and about 80° C., about −20° C. and about 70° C., about −20° C. and about 60° C., about −20° C. and about 50° C., about −20° C. and about 40° C., or about −20° C. and about 30° C.

In some embodiments, the electrochemical cell has a fuel cell output voltage greater than 1.5 V, 1.6 V, 1.7 V, 1.8 V, 1.9 V, or 2.0 V. In some embodiments, the electrochemical cell has a fuel cell output voltage between 1.0 V and 4.0 V, 1.0 V and 3.5 V, 1.0 V and 3.0 V, 1.0 V and 2.5 V, 1.0 V and 2.0 V, 1.0 V and 1.5 V, 1.5 V and 4.0 V, 1.5 V and 3.5 V, 1.5 V and 3.0 V, 1.5 V and 2.5 V, 1.5 V and 2.0 V, 2.0 V and 4.0 V, 2.0 V and 3.5 V, 2.0 V and 3.0 V, 2.0 V and 2.5 V, 2.5 V and 4.0 V, 2.5 V and 3.5 V, or 2.5 V and 3.0 V.

The following examples are illustrative and non-limiting of the electrochemical cells, methods of making, and methods of using described herein. Suitable modifications and adaptations of the variety of conditions, formulations and other parameters normally encountered in the field and which are obvious to those skilled in the art in view of this disclosure are within the spirit and scope of the invention.

EXAMPLES

Example 1

Lithium bis(trifluoromethane sulfonyl)imide (LiN$(SO_2CF_3)_2$, LiTFSI) (>98%) and water (HPLC grade) were purchased from Tokyo Chemical Industry and Sigma-Aldrich, respectively. The water-in-salt electrolyte (21 m LiTFSI) is prepared by dissolving LiTFSI in water according to molality (21 mol salt in 1 kg water). The tris (trimethylsilyl) borate (TMSB) was purchased from Sigma-Aldrich. 0.1% mass ratio of TMSB additive was added to the water-in-salt electrolyte to form the 21 m LiTFSI-0.1% TMSB electrolyte.

The LiCoO$_2$ materials were purchased from MTI Corporation (Richmond, CA).

Example 2

The morphology of the sample was investigated by scanning electron microscopy (SEM) with a Hitachi SU-70 (Krefeld, Germany) and transmission electron microscopy (TEM, JEM 2100 FEG, 200 keV). All the samples for ex situ TEM were recovered from a full aqueous Li-ion battery in 2032 coin cell configuration after electrochemical cycling. The samples were washed with dimethyl ether three times and then dried under vacuum for two hours. X-ray diffraction (XRD) patterns were obtained on a Bruker Smart 1000 (Bruker AXS, Inc. (Billerica, MS)) using Cu K$\alpha$ radiation with an airtight holder from Bruker. X-ray photoelectron spectroscopy (XPS) was conducted on a high sensitivity Kratos AXIS 165 X-ray photoelectron spectrometer (Manchester, U.K.) with Mg K$\alpha$ radiation. For inductively coupled plasma atomic emission spectroscopy (ICP) measurements, the electrolyte for the full aqueous Li-ion battery with 3 mg cathode assembled in a bottle was diluted in 2% HNO$_3$ solution to form 25 mL. Inductively coupled plasma optical emission spectroscopy (ICP-OES) measurements were performed using a Shimadzu ICPE-9820 Dual View Spectrometer (Kyoto, Japan).

Example 3

The LiCoO$_2$ and Mo$_6$S$_8$ electrodes were fabricated by compressing active materials, carbon black, and polytetrafluoroethylene (PTFE) at a weight ratio of 8:1:1 onto a stainless steel grid, respectively. The three-electrode devices for cathode consisted of LiCoO$_2$ composite (about 2 mg) as working electrode, platinum foil as the counter electrode, and Ag/AgCl as the reference electrode. Cyclic voltammetry (CV) was carried out using a CHI 600E electrochemical work station at a scanning rate of 0.1 mV/s for these composite working electrodes. CV was also applied to determine the electrochemical stability window at 10 mV/s using a 316 stainless steel grid (200-mesh sieve) as both working and counter electrodes, which were thoroughly cleaned ultrasonically in high purity alcohol, and then washed three times with high purity water and dried before measurement. The potentials vs. Ag/AgCl were converted to those vs. standard Li$^+$/Li, supposing that the potential of Ag/AgCl electrode was 3.239 V vs Li+/Li.

A full aqueous lithium ion battery (ALIB) cell was assembled in a CR2032-type coin cell using a LiCoO$_2$ cathode (about 10 mg/cm$^2$), a Mo$_6$S$_8$ anode (about 8 mg/cm$^2$), and glass fiber as separator. The charge-discharge experiments were performed on a Land BT2000 battery test system (Wuhan, China) at room-temperature.

Example 4

All electron density functional theory (DFT) calculations with unrestricted spin were conducted under Dmol$^3$ modules in Materials Studio within GGA PW91 functional. 3.5 version Double Numerical plus d-functions (DND) basis set was chosen. Conductor-like screening model (COSMO), in which solvent is approximated by a dielectric continuum surrounding the solute molecules outside of a molecular cavity, was used to investigate the influence of water and solvent, and the dielectric constant of water (78.54) was applied. To ensure the configuration of lowest energy, geometry optimization was conducted with several different initial configurations and the optimized configuration with lowest energy was selected.

Example 5

Figure 1B:
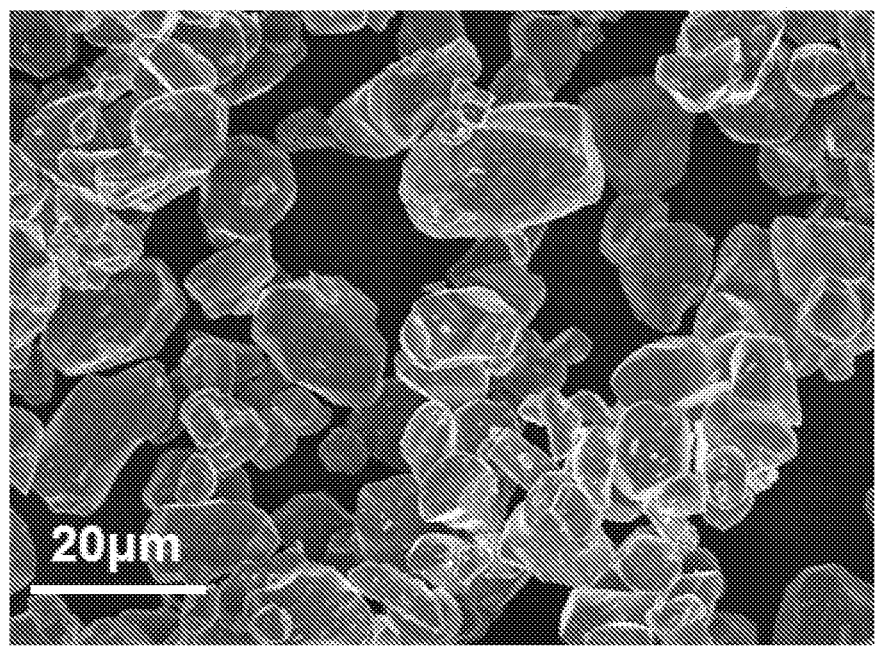
FIG. 1B is scanning electron microscope (SEM) image of pristine $LiCoO_2$ powder. The image reveals that all particles range between several to tens of microns in size.
Figure 2A:
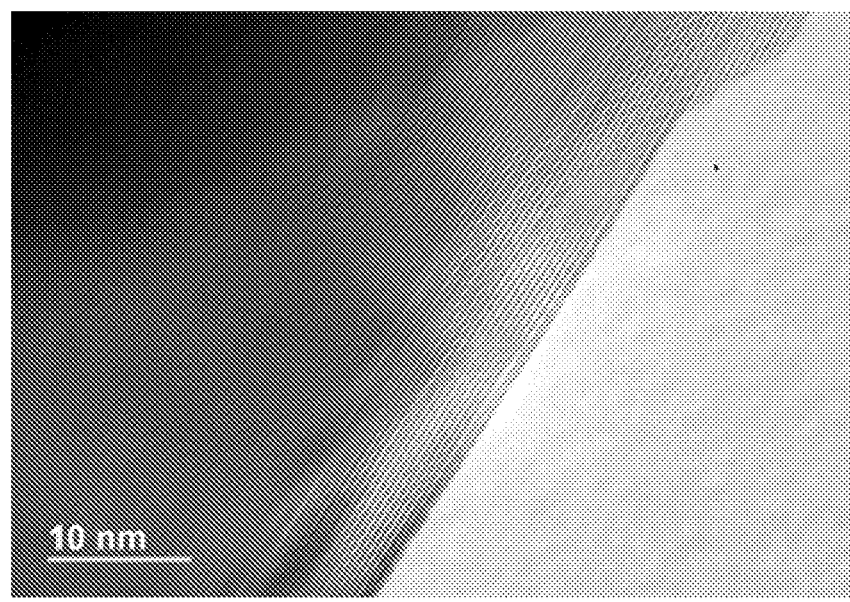
FIG. 2A is a transmission electron microscope (TEM) image of pristine $LiCoO_2$ powder. The image confirms the typical layer structure of $LiCoO_2$ with a clean and well-defined surface.
Figure 2B:
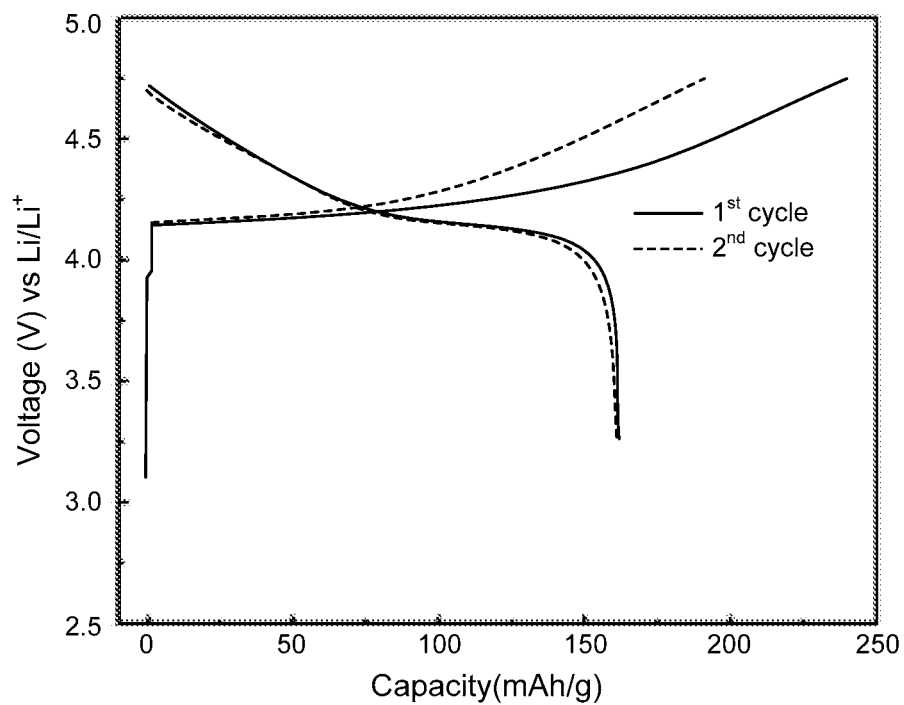
FIG. 2B is a graph of the typical voltage profile of $LiCoO_2$ between 4.7 V and 3.2 V (vs $Li^+/Li$) in a water-in-salt electrolyte (21 m LiTFSI in $H_2O$) at a current of 0.2 C measured in a three-electrode cell using Pt as the counter electrode and Ag/AgCl as the reference electrode.

FIG. 1A shows the XRD patterns of pristine LiCoO$_2$, where all peaks can be indexed to the hexagonally packed O$_3$ layered structure with an R3m space group. FIG. 1B shows the SEM image of pristine LiCoO$_2$ which reveals that all particles range between several to tens of microns in size. FIG. 2A confirms the typical layer structure of pristine LiCoO$_2$ as containing a clean and well-defined surface. This cathode can be reversibly charged/discharged between 3.0 V to 4.5 V in typical non-aqueous electrolytes without severe surface structure changes. In water-in-salt electrolytes, the potential of redox lithiation/delithiation will positively shift by ~0.2 V due to the high salt concentration. Thus, the corresponding upper cut-off voltage of HVLCO should be 4.7 V for the same fraction of Li removal. The galvanostatic lithiation/delithiation behavior of HVLCO in water-in-salt electrolytes was evaluated in a three-electrode cell with Pt as the counter electrode and Ag/AgCl as the reference electrode. As shown in FIG. 2B, a reversible discharge capacity of 170 mAhg$^{-1}$ was delivered by HVLCO when cycled between 3.2 V and 4.7 V (vs Li$^+$/Li). Comparing the voltage profiles, it can be determined that the lithiation/delithiation behavior of HVLCO in water-in-salt electrolytes is rather similar to its behavior in non-aqueous electrolytes, except for the positive potential upshift by 0.2 V.

Figure 3A:
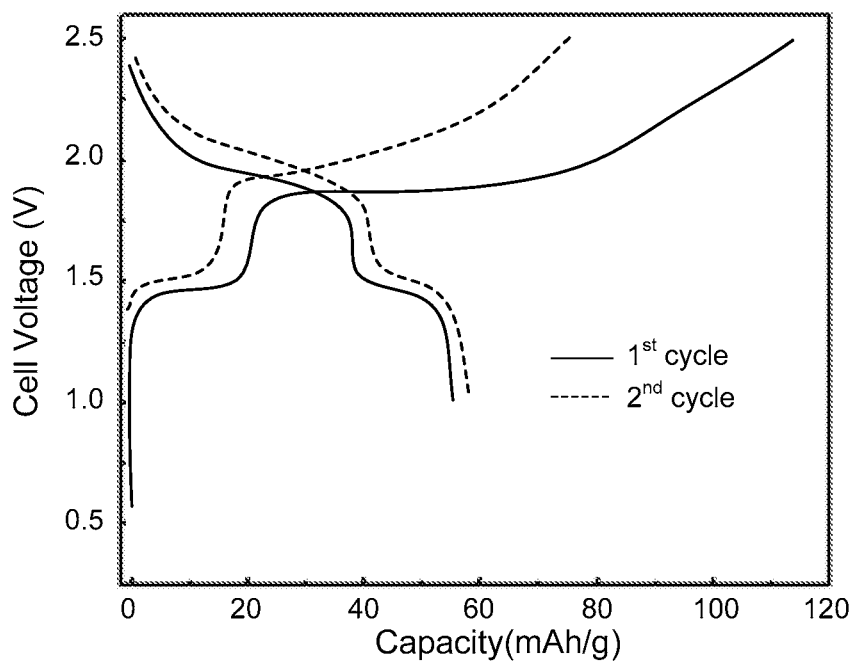
FIG. 3A is a graph of the typical voltage profile of a water-in-salt electrolyte between 1.0 V and 2.5 V at 0.5 C with a $HVLCO/Mo_6S_8$ full cell (HVLCO corresponds to $LiCoO_2$ with 0.7 fraction of Li removed).
Figure 3B:
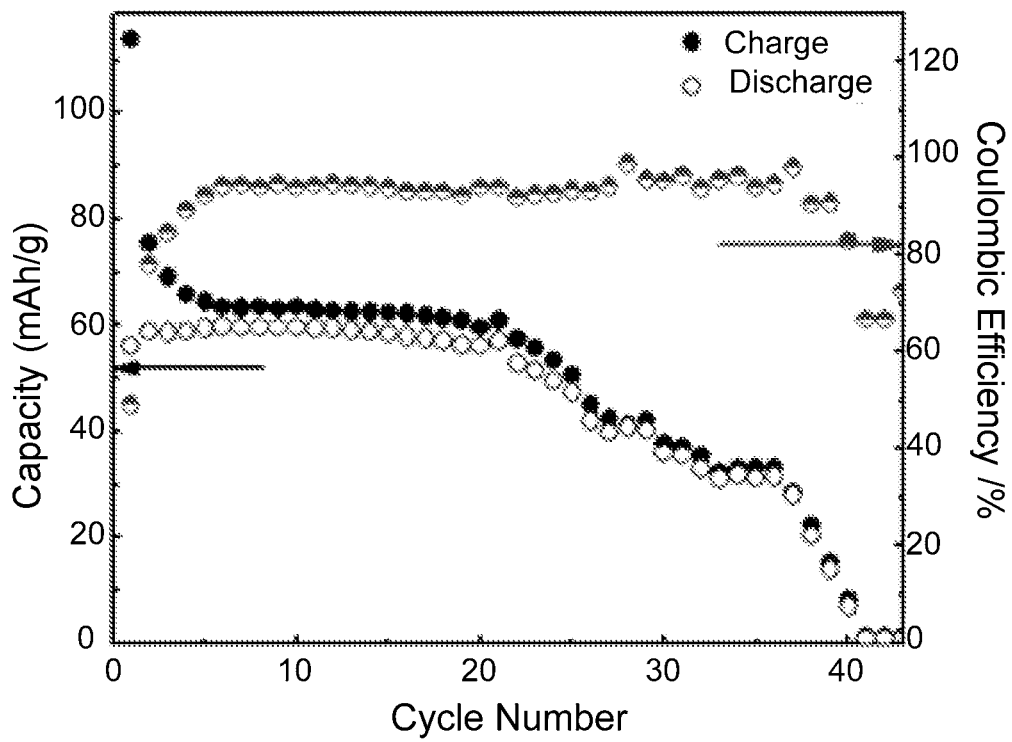
FIG. 3B is a graph of the cycling stability and Coulombic efficiencies at a current of 0.5 C for a water-in-salt electrolyte between 1.0 V and 2.5 V with a $HVLCO/Mo_6S_8$ full cell.
Figure 4A:
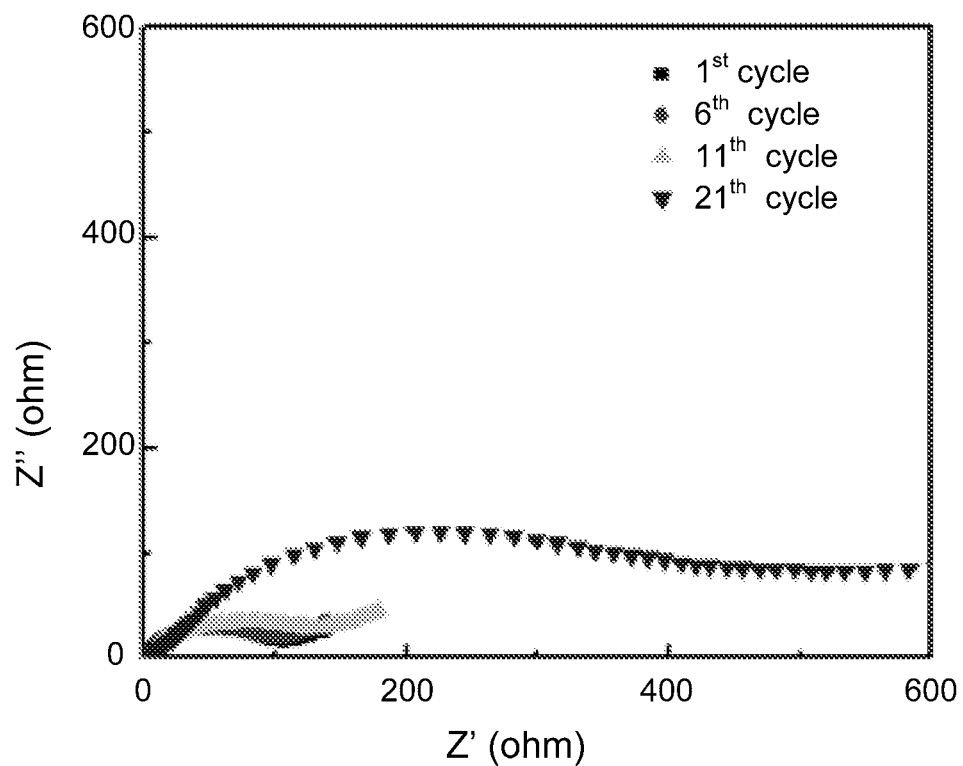
FIG. 4A is graph of electrochemical impedance spectroscopy (EIS) measurements after the 1st, 6th, 11th, and 21st cycles for a water-in-salt electrolyte between 1.0 V and 2.5 V at a current of 0.5 C with a $HVLCO/Mo_6S_8$ full cell.

The lithiation/delithiation potential of chevrel phase Mo$_6$S$_8$ (~2.2 V) has been shown to rest safely within the electrochemical stability window of water-in-salt electrolytes, where it can be charged/discharged for thousands of cycles with negligible fading. See Suo, L., et al., *Science* 350:938-943 (2015). When coupled with a HVLCO, a 2.5 V full aqueous Li-ion cell can be produced. The HVLCO/Mo$_6$S$_8$ mass ratio was set to 1:1 in order to compensate for the irreversible capacity incurred by the formation of SEI at the Mo$_6$S$_8$ anode during the initial cycles. FIG. 3A shows the charge/discharge curves of a HVLCO/Mo$_6$S$_8$ full cell between 2.5 V (4.7 V vs Li for LiCoO$_2$ cathode) and 1.0 V. Two distinct voltage plateaus were observed at 0.5 C for the full cell, at about 2.0 V and 1.5 V, respectively, because of the two reversible redox couples of Mo$_6$S$_8$, which is delithiated at 2.24 V and 2.67 V in water-in-salt electrolyte, respectively. A discharge capacity of 60 mAh/g (of total electrode mass) and an energy density of 120 Wh/kg were obtained from such a full cell for 20 cycles, after which a rapid capacity fading occurred as shown in FIG. 3B. However, a very stable capacity lasted for over 50 cycles when the same full cell was charged/discharged between 2.1 V and 1.0 V. as shown in FIG. 4A, the electrochemical impedance spectra (EIS) at different cycle numbers revealed that the interfacial resistances remain stable between 100-150 ohm during the first 20 cycles, followed by quick increases to >400 ohm at the 21$^{st}$ cycle.

Figure 4B:
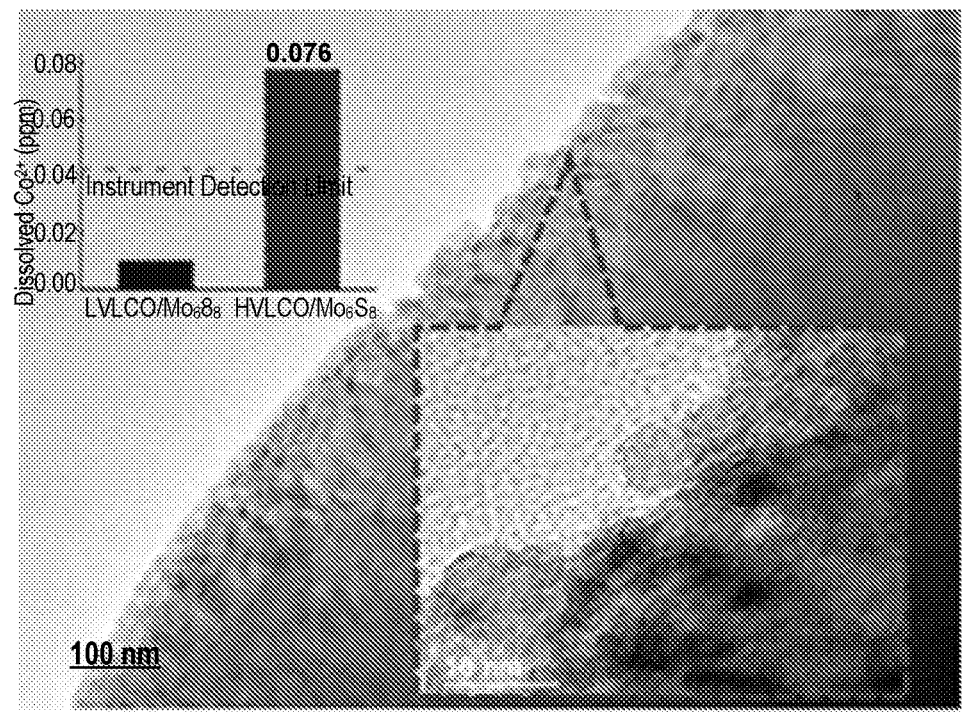
FIG. 4B is a TEM image for the cycled HVLCO electrodes in a 21 m LiTFSI electrolyte for a water-in-salt electrolyte between 1.0 V and 2.5 V at a current of 0.5 C with a $HVLCO/Mo_6S_8$ full cell. The inset in FIG. 4B shows the amount of dissolved $Co^{2+}$ in the electrolyte measured using inductively-coupled plasma-mass spectroscopy (ICP-MS).
Figure 7A:
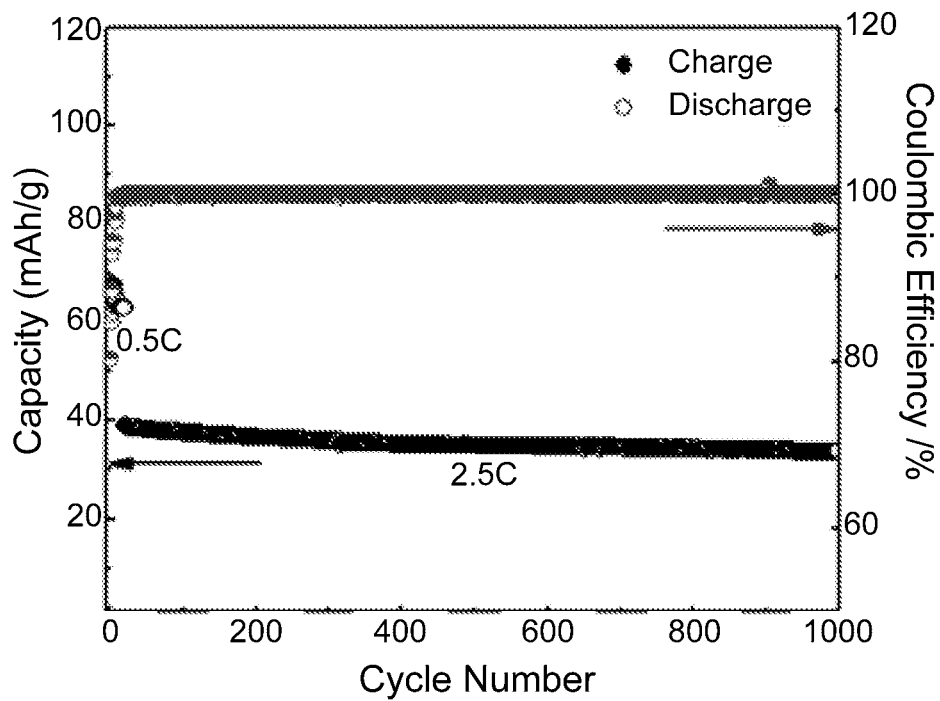
FIG. 7A is a graph showing the cycling stability and Coulombic efficiency at a high rate of 2.5 C (after cycling for the first 20 cycles at a current of 0.5 C) for a $HVLCO/Mo_6S_8$ full cell in a 21 m LiTFSI electrolyte with 0.1 mass percent TMSB.
Figure 7B:
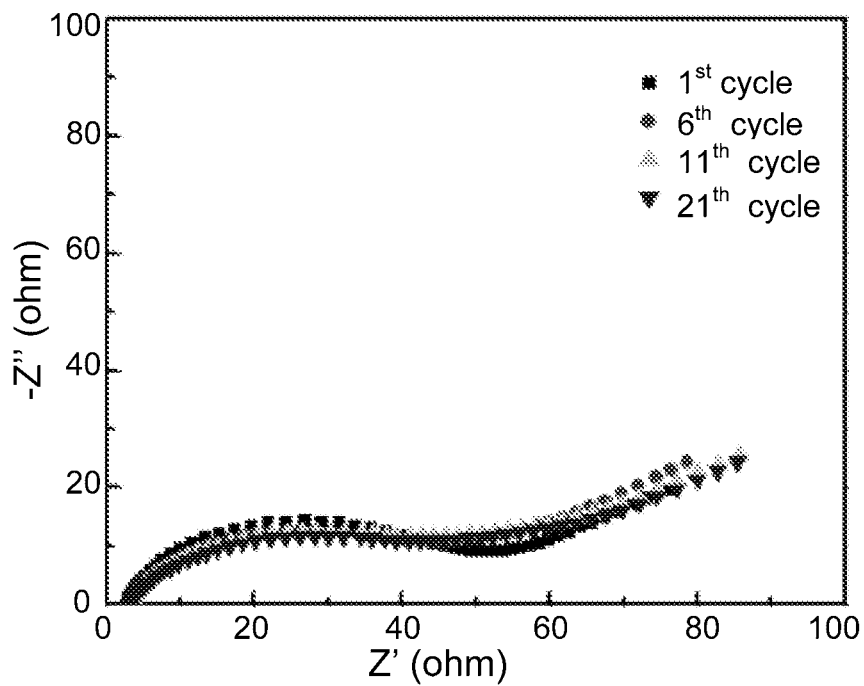
FIG. 7B is graph of EIS measurements for a HVLCO/$Mo_6S_8$ full cell in 21 m LiTFSI electrolyte with 0.1 mass percent TMSB taken after the 1st, 6th, 11th, and 21st cycles.

Since Mo$_6$S$_8$ has been known to stably cycle in water-in-salt electrolyte (Suo, L., et al., *Science* 350:938-943 (2015)), this rapid capacity fading should very likely arise from the cathode side. Thus the surface structure of the cycled HVLCO was examined using high-resolution TEM as shown in FIG. 4B, which revealed that the smooth edges of pristine material became rough with small notches after 50 cycles in water-in-salt electrolytes, while the layer structure of LiCoO$_2$ remained intact as shown in the high-resolution TEM (inset of FIG. 7B). The notches on the surface of HVLCO show disordered nanocrystals with smaller d-spacing than that of $LiCoO_2$, which could be indexed as cobalt oxides. It is believed that the formation of cobalt oxide layer resulted from the reaction between the electrolyte and HVLCO surface, which became highly oxidative upon more than 0.5 fraction of Li removal. In addition, Co-dissolution also occurred simultaneously, as evidenced by the inductively coupled plasma (ICP) spectroscopy analysis conducted on the electrolyte recovered from the cycled full cell (shown in the inset in FIG. 4B), which show that the concentration of the dissolved Co in electrolyte recovered from 50 cycles between 2.5 V and 1.0 V is 0.0776 ppm, while none was detected if the cell was cycled at lower voltage limits of 2.1 V and 1.0 V. Hence it was concluded that the overall effects of both surface defects presence, Co dissolution and formation of cobalt oxide at high voltages, are responsible for the rapid capacity fading of HVLCO in water-in-salt electrolyte. A similar correlation among surface defect, the capacity fading, and resistance growth was also established previously for LVLCO cycled in aqueous electrolyte between 4.1 V and 2.7 V (vs $Li^+$/Li). See Ramanujapuram, A., et al., *Energy Environ. Sci.* 9:1841-1848 (2016).

Figure 5A:
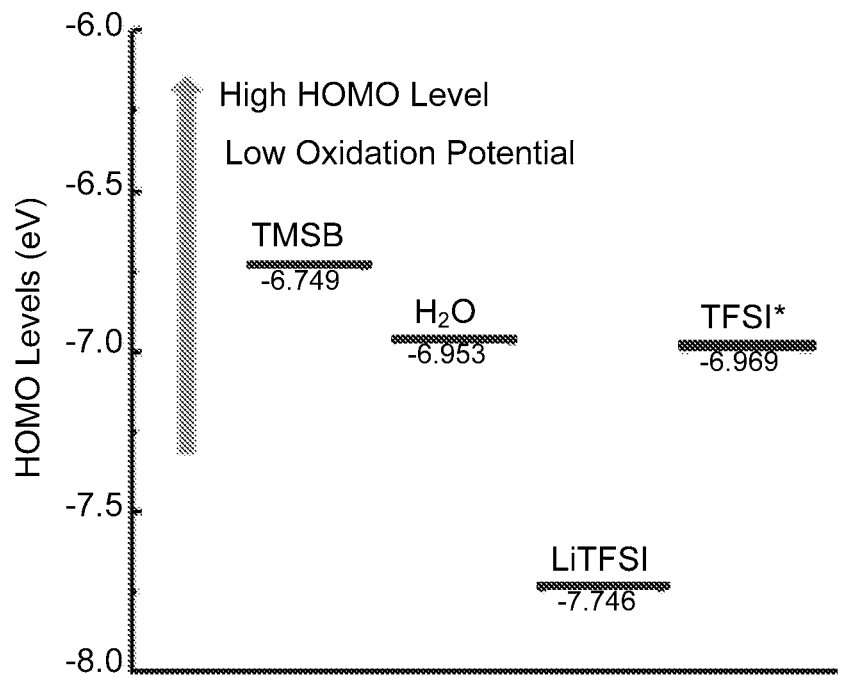
FIG. 5A is a graph showing the HOMO levels of tris (trimethylsilyl)borate (TMSB), $H_2O$, LiTFSI, and TFSF.

The most effective and economical strategy in suppressing the damage of HVLCO surface structure and Co dissolution is to introduce extra surface protection through electrolyte additives, whose electrochemical oxidation forms a solid interphase in a similar manner as SEI is formed on anode surface. Although the additive approach has been used in non-aqueous electrolytes (see K. Xu, *Chem. Rev.* 104:4303-4418 (2004)), it has not been applied to aqueous electrolyte systems, and more stringent requirements have to be met in this particular case: (1) the additive itself must possesses lower oxidation potential than the water in the water-in-salt electrolyte, which is ca. 4.9 V vs. Li; and (2) the additive itself must remain chemically stable against water (non-hydrolysable). After extensive screening, a borate ester, tris(trimethylsilyl) borate (TMSB), was identified as a qualifying cathode additive, which does not hydrolyze in the water-in-salt electrolyte. First principles calculations were carried out on TMSB, whose highest occupied molecular orbital (HOMO) level, a critical element determining oxidation reaction (Han, Y. K., et al., *J. Mater. Chem. A* 3:10900-10909 (2015)), was compared with those of $H_2O$ and TFSI anion in a water-in-salt electrolyte. As shown in FIG. 5A, the HOMO level of TMSB is the highest among all the molecules or anions, indicating that it will be the first to be oxidized when the cell voltage increases, before water or salt anion. See Liao, X. L., et al., *Applied Energy* 175:505-511 (2016). If the decomposition product is a densely-packed solid and possesses electrolyte nature, i.e., ionically conductive but electronically insulating, then TMSB would serve as an excellent cathode SEI additive in aqueous electrolyte.

Figure 5B:
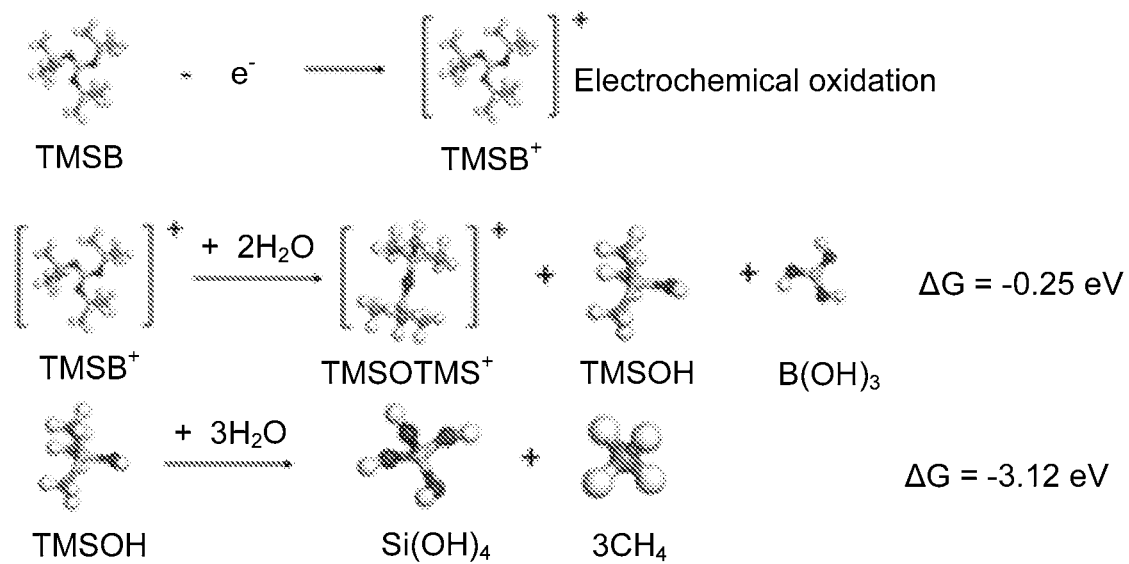
FIG. 5B is a schematic representation of the possible mechanisms for electrochemical oxidative decomposition of TMSB.

The oxidative pathway of TMSB in water was explored by using the first principles calculations, whose energetically favorable oxidation pathway in water-in-salt electrolyte is shown in FIG. 5B. According to the simulation, the continuous hydrolytic reactions of oxidized TMSB ($TMSB^+$) leads to the formation of boric acid and orthosilicic acid together with $TMSOTMS^+$ and TMSOH, which is an intermediate product. Although boric acid and orthosilicic acid dissolve in water, they are insoluble in the water-in-salt electrolyte. Thus, they could co-precipitate on the cathode surface and serve as a robust cathode SEI. The protection mechanism of TMSB additive in aqueous electrolyte should differ from TMSB in non-aqueous electrolytes. In the later, the improved cycling performance was ascribed to the removal of HF impurity and the suppression of LiF formation. See Li., J. H., et al., *J. Power Sources* 285:360-366 (2015). However, no LiF or HF should exist, at least on the cathode side, in a water-in-salt battery. On the other hand, oxygen evolution from aqueous electrolyte should become the main parasitic process that the cathode SEI prevents.

Figure 6A:
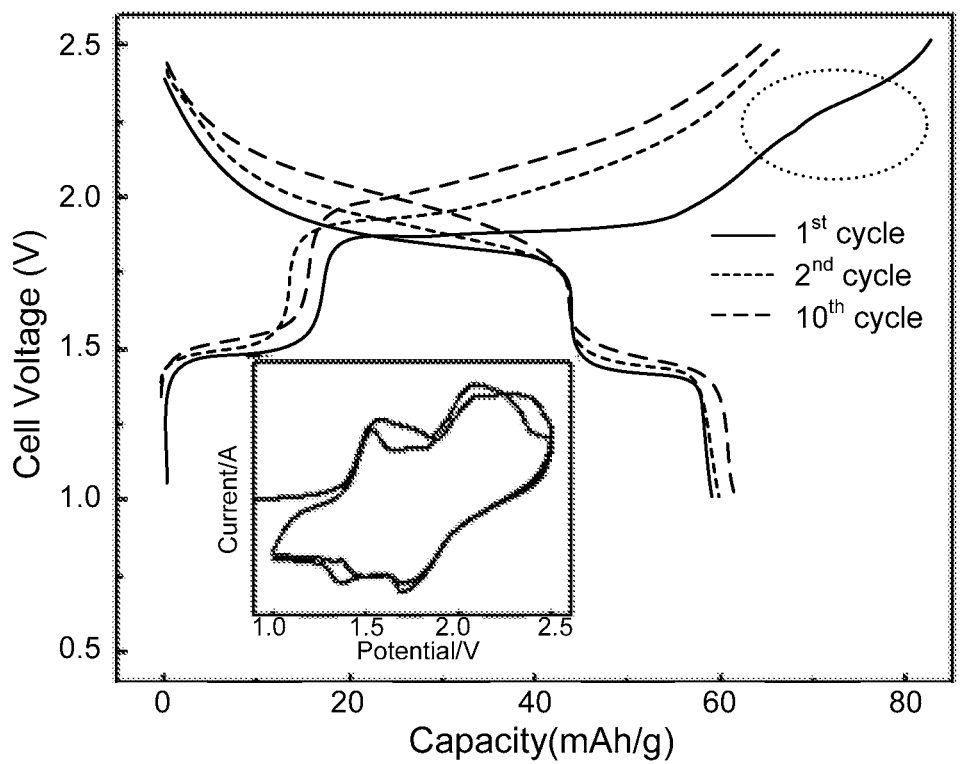
FIG. 6A is a graph showing the typical voltage profile at a constant current of 0.5 C between 1.0 V and 2.5 V for a $HVLCO/Mo_6S_8$ full cell in a 21 m LiTFSI electrolyte with 0.1 mass percent TMSB. The inset in FIG. 6A shows the cyclic voltammetry (CV) curves.

Based on the theoretical calculation, the electrochemical performance of HVLCO/$Mo_6S_8$ full cell was evaluated in 21 m LiTFSI electrolyte with 0.1 mass percent TMSB additive. FIG. 6A shows the charge/discharge behavior of the full cell at a 0.5 C rate. In the first charge, an additional plateau at about 2.25 V (highlighted by circle) was observed, which could be ascribed to the TMSB oxidation. The 2.25 V plateau disappeared in the following cycles, indicating that the oxidation of TMSB is an irreversible process that only occurred in the first cycle, and once a SEI is formed, TMSB should be completely consumed from the electrolyte. After the first charging, the following voltage profiles becomes identical to those of HVLCO/$Mo_6S_8$ full cell in additive-free electrolytes, suggesting that TMSB does not affect the electrochemical lithiation/delithiation of both HVLCO cathode or $Mo_6S_8$ anode except for the $1^{st}$ cycle where SEI forms on HVLCO surface.

Figure 6B:
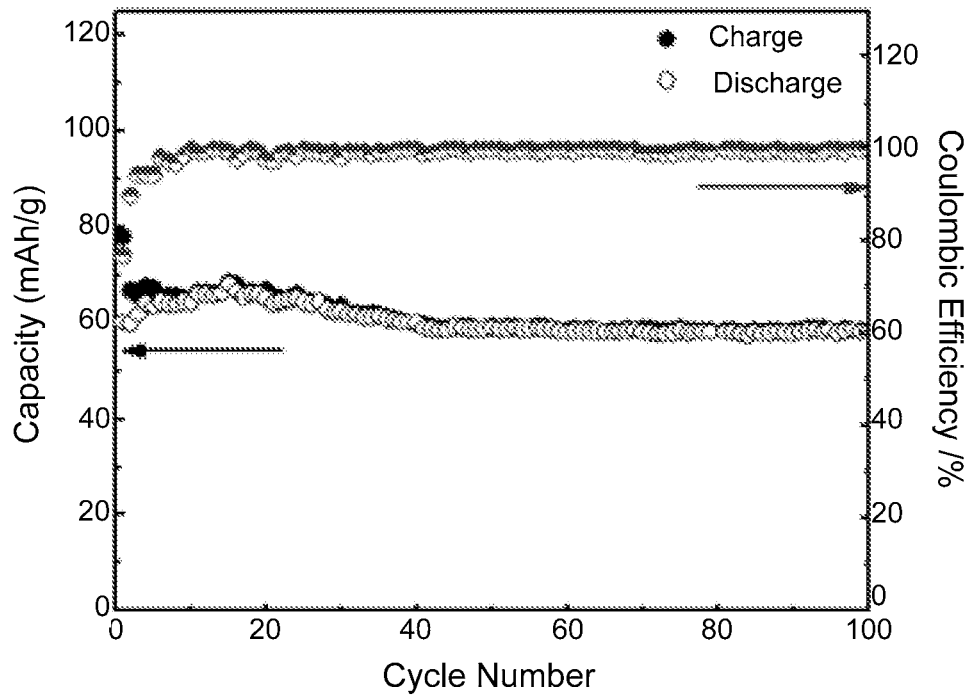
FIG. 6B is a graph showing the cycling stability and Coulombic efficiency at a low current rate of 0.5 C for a $HVLCO/Mo_6S_8$ full cell in 21 m LiTFSI electrolyte with 0.1 mass percent TMSB.

As shown in FIG. 6B, the oxidation of TMSB must have formed a stable surface interphasial phase, which significantly suppressed parasitic reactions on the high oxidizing HVLCO surface, because the columbic efficiency increased from 94% of TMSB-free electrolyte (see FIG. 3B) to ~100% in 21 m LiTFSI-0.1% TMSB electrolyte after the first 8 cycles. Moreover, the irreversible capacity induced by formation of a cathode SEI on the HVLCO cathode in the first charge, which should produce extra $Li^+$, was cancelled out by the negative irreversible capacity from formation of a SEI on the $Mo_6S_8$ anode, which consumes $Li^+$ The net result is thus that the columbic efficiency in the first cycle improved from 50% of TMSB-free electrolyte (FIG. 3B) to 75% in 21 m LiTFSI-0.1% TMSB (FIG. 6B) electrolyte. Remarkably, a 92% capacity retention was achieved for the full cell after 100 cycles at 0.5 C rate. The long term cycling stability of the HVLCO/$Mo_6S_8$ full cell was examined at a high rate of 2.5 C (FIG. 7A), where extremely high capacity retention, with minimum capacity decay rate of 0.013% per-cycle, was observed for 1000 cycles in 21 m LiTFSI with 0.1 mass percent TMSB electrolytes. The stable interfacial impedance as detected by EIS at different cycles (FIG. 7B) which confirmed the effective protection of SEI on the HVLCO surface. Thus, a 0.5 C HVLCO/$Mo_6S_8$ full cell using 21 m LiTFSI-0.1% TMSB electrolyte provided an energy density of 120 Wh/kg, which is among the highest energy density in all the aqueous batteries reported to date.

Figure 8A:
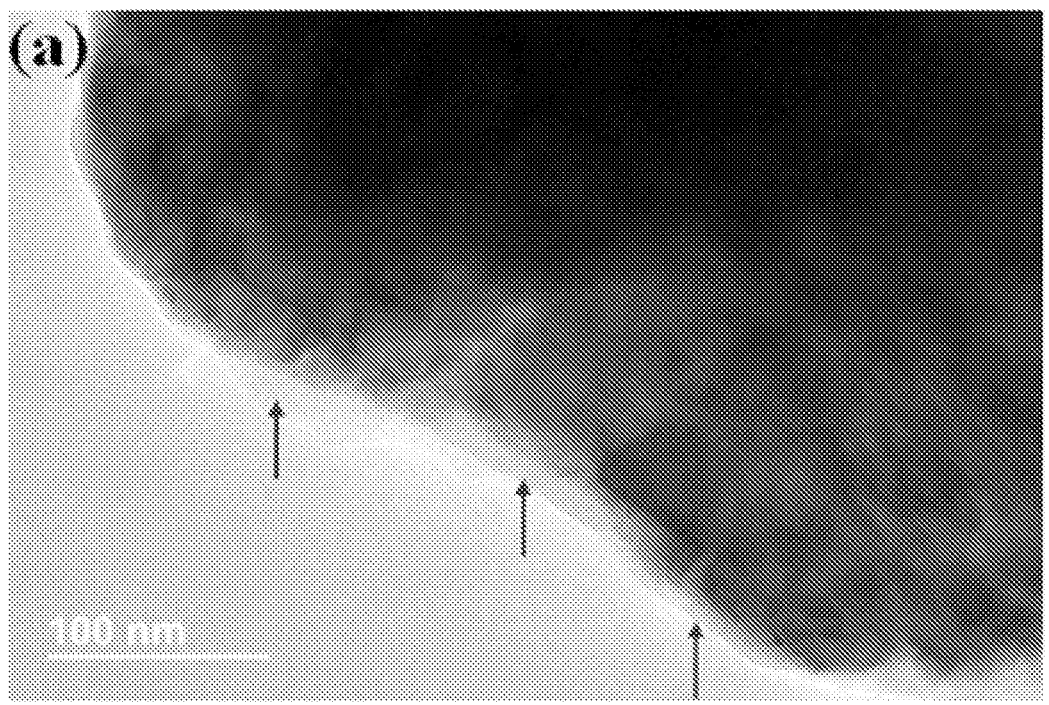
FIG. 8A is a TEM image for the HVLCO electrodes after cycling in 21 m LiTFSI with 0.1 mass percent TMSB at a magnification of 100 nm.
Figure 8B:
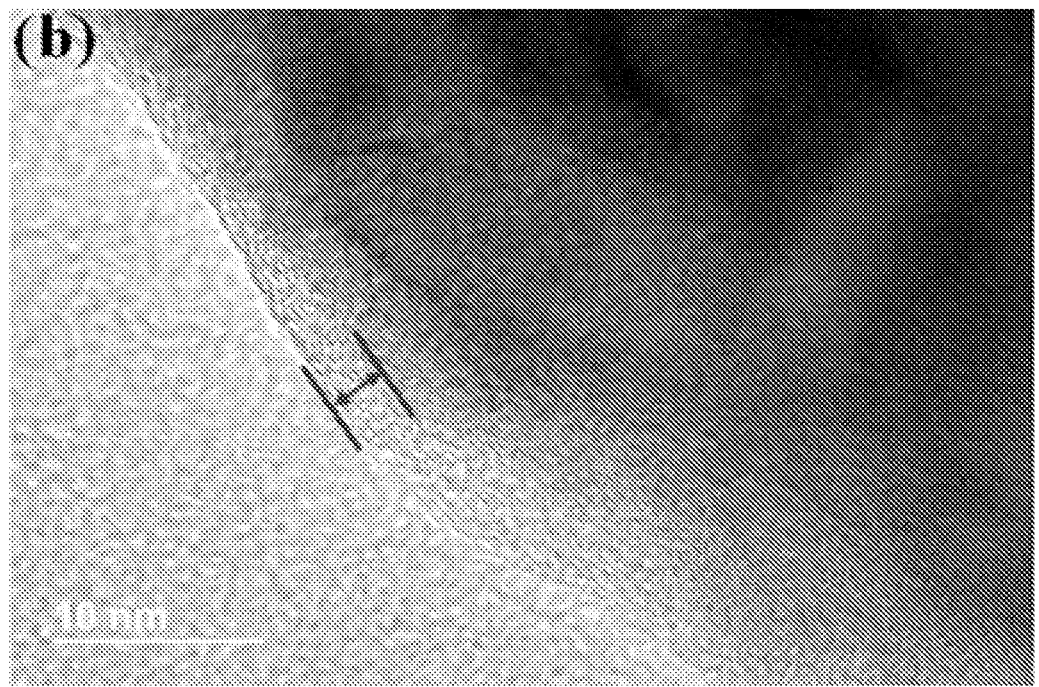
FIG. 8B is a TEM image for the HVLCO electrodes after cycling in 21 m LiTFSI with 0.1 mass percent TMSB at a magnification of 10 nm.

The chemical composition of the SEI on HVLCO surface formed by the oxidation of TMSB additive was analyzed by transmission electron microscopy (TEM). FIGS. 8A and 8B show the surface morphology of HVLCO electrode after 100 charge/discharge cycles in the electrolytes with TMSB additive. A ~10 nm thick surface layer is coated on a HVLCO particle, which should be the electrochemical oxidation product of TMSB additive that generates a conformal coating on cathode particle during the initial charging. The high-resolution TEM image (FIG. 8B) further reveals the amorphous nature of the surface coating layer. In contrast with FIG. 4B, no obvious surface defects were observed on HVLCO that is now protected by a cathode SEI, suggesting that the surface layer eliminates Co-dissolution and hence improves the cycle performance of HVLCO. The suppression of Co dissolution was also confirmed by the ICP analysis, where the concentration of dissolved Co in electrolytes after 100 cycles was negligible in the presence of TMSB as additive in water-in-salt electrolyte.

Figure 9:
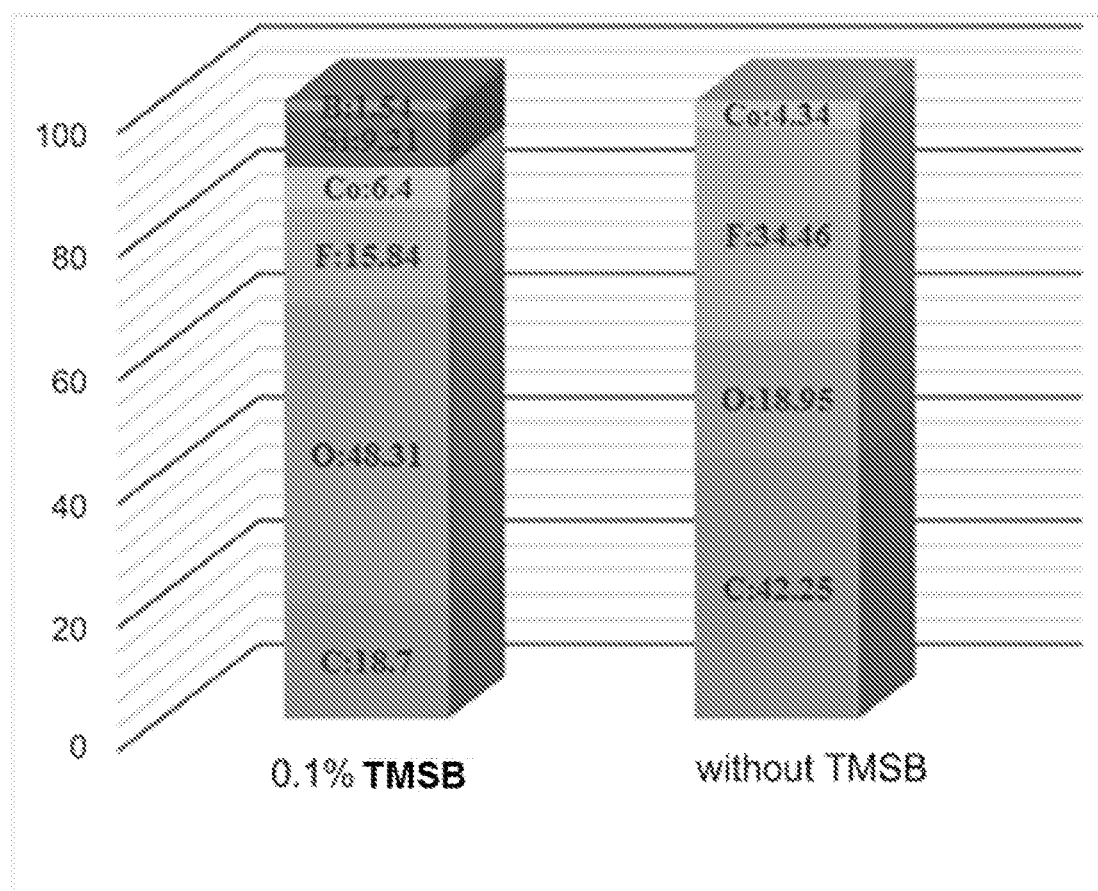
FIG. 9 is a graph showing the atomic compositions of the surface films on HVLCO electrodes after cycling.
Figure 10A:
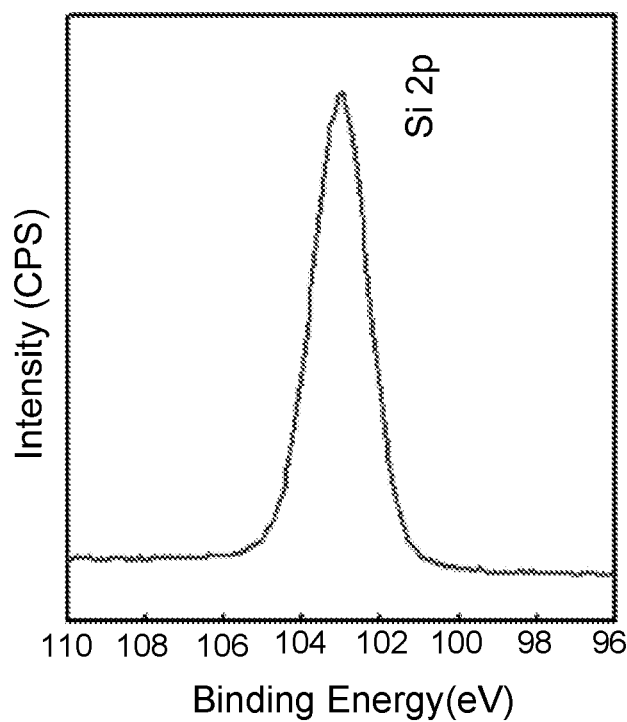
FIG. 10A is an X-ray photoelectron spectroscopy (XPS) spectra corresponding to Si 2p elements detected on the surface of a HVLCO electrode cycled in the presence of 0.1 mass percent TMSB.
Figure 10B:
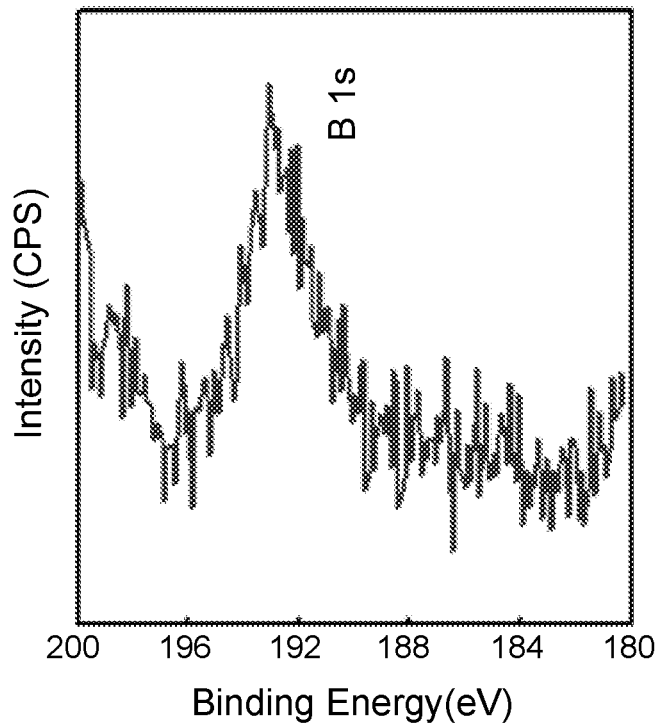
FIG. 10B is an XPS spectra corresponding to B is elements detected on the surface of the HVLCO electrode cycled in the presence of 0.1% TMSB.

The composition of the cathode SEI was determined using XPS by examining the surfaces of the cycled HVLCO cathode with and without TMSB additive. The atomic compositions of the surface layer are listed in FIG. 9. Compared with the surface composition of HVLCO cycled in an additive-free water-in-salt electrolyte, additional signals corresponding to Si (Si 2p) and B (B 1s) elements are clearly detected on the surface of HVLCO cycled in presence of 0.1 mass percent of TMSB (FIGS. 8A and 8B). The binding energy of Si 2p located at ~103 eV, between the $Si^+$ (103.4 eV) and $Si^{3+}$ (102.1 eV). See He, J. W., et al., *Surf Sci.* 279:119-126 (1992). Therefore, the species was assigned to $Si(OH)_4$ containing minor fractions of $Si(OH)_3$. Similarly, the binding energy peak of B is at 193 eV is attributed to the $B(OH)_3$ with minor boron subhydroxides (Wang, Y. J., et al., Chem. Mater. 5:192-198 (1993)), which is in agreement with the simulation results in FIG. 5B. All the electrochemical, surface analysis, and first principle calculations converge to suggest that TMSB additive in water-in-salt electrolytes can form a protective cathode SEI on the HVLCO surface, thus allowing HVLCO to be stably charged/discharged at a high cut-off voltage, delivering a high capacity of 170 mAh/g with excellent stability for 1000 cycles, which is hitherto the highest reported for any aqueous Li-ion batteries. Furthermore, in addition to the high achieved energy density and excellent cycling stability, the interphasial additive approach works in aqueous electrolyte. This new finding opens up a very critical pathway in future direction of aqueous electrolytes of better electrochemical stability and lower cost.

Having now fully described this invention, it will be understood by those of ordinary skill in the art that the same can be performed within a wide and equivalent range of conditions, formulations and other parameters without affecting the scope of the invention or any embodiment thereof.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

All patents and publications cited herein are fully incorporated by reference herein in their entirety.

We claim:

1. An electrochemical cell comprising: (a) an anode; (b) a cathode; and (c) an aqueous or a hybrid electrolyte, wherein a content of water in the hybrid electrolyte is between 1% and 99%; wherein the cathode comprises a solid electrolyte interphase layer that covers a cathode active material, wherein the solid electrolyte interphase layer is a decomposition product of at least one oxidative additive, wherein the oxidative additive is selected from the group consisting of thiophene, 3-chlorothiophene, 3-hexylthiophene, furan, furfural, benzofuran, pyrrole, indole, tris(trimethylsilyl)phosphate, tris(hexafluoroisopropyl)phosphate, triallyl phosphate, N,N-diethylamino trimethyl silane, tris(pentafluorophenyl) silane, phenyl tris-2-methoxydiethoxy silane, tris(trimethylsilyl) borate, trimethyl borate, and triethyl borate, and wherein the electrochemical cell has an output voltage of between about 2.0 V and about 4.0 V; wherein the cathode active material is a lithium metal oxide or a lithium metal phosphate.

2. The electrochemical cell of claim 1, wherein the cathode active material is selected from the group consisting of $LiFePO_4$, $LiMn_2O_4$, $LiCoO_2$, $LiNi_{0.33}Mn_{0.33}Co_{0.33}O_2$, $LiNi_{0.6}Mn_{0.2}Co_{0.2}O_2$, $LiNi_{0.8}Mn_{0.1}Co_{0.1}O_2$, $LiNi_{0.5}Mn_{1.5}O_4$, $LiNi_{0.8}Co_{0.15}Al_{0.05}O_2$, and $LiMnPO_4$.

3. The electrochemical cell of claim 1, wherein the solid electrolyte interphase layer covers between about 40% and about 100% of the cathode active material.

4. The electrochemical cell of claim 1, wherein the aqueous or hybrid electrolyte is selected from the group consisting of $LiN(SO_2CF_3)_2$, $LiN(SO_2CH_3)_2$, $LiN(SO_2C_4H_9)_2$, $LiN(SO_2C_2F_5)_2$, $LiN(SO_2C_4F_9)_2$, $LiN(SO_2F_3)(SO_2C_4F_9)$, $LiN(SO_2C_2F_5)(SO_2C_4F_9)$, $LiN(SO_2C_2F_4SO_2)$, $LiN(SO_2F)_2$, and $LiN(SO_2F)(SO_2CF_3)$.

5. The electrochemical cell of claim 1, wherein the anode is selected from the group consisting of lithium, magnesium, aluminum, molybdenum, zinc, chromium, iron, nickel, tin, lead, copper, silver, palladium, mercury, platinum, gold, combinations thereof, metal alloys thereof, metal oxides thereof, metal phosphates thereof, and metal sulfides thereof.

6. The electrochemical cell of claim 1, wherein the capacity decay rate (mAh/g) at a C-rate of about 2.5 C is between about 0.005% and about 0.1% per cycle.

7. The electrochemical cell of claim 1, wherein the energy density at a C-rate of about 0.5 C is between about 20 Wh/kg and about 200 Wh/kg.

8. The electrochemical cell of claim 1, wherein the oxidative additive is tris(trimethylsilyl) borate.

9. The electrochemical cell of claim 1, wherein the volume percent of non-aqueous solvents in the hybrid electrolyte is between about 1% and about 10%.

* * * * *